(12) United States Patent
Marshall, Jr. et al.

(10) Patent No.: US 11,573,545 B2
(45) Date of Patent: Feb. 7, 2023

(54) INTERACTIVE DYNAMIC INTERFACE FOR CAPACITOR CONTROL

(71) Applicant: Advanced Control Systems Corporation, Canton, MA (US)

(72) Inventors: Charles W. Marshall, Jr., Milton, MA (US); Peter Battelino, Huntington, NY (US); Spartak Daci, Quincy, MA (US); David Rossano-Collier, Plymouth, MA (US)

(73) Assignee: Advanced Control Systems Corporation, Canton, MA (US)

( * ) Notice: Subject to any disclaimer, the term of this patent is extended or adjusted under 35 U.S.C. 154(b) by 471 days.

(21) Appl. No.: 16/777,518

(22) Filed: Jan. 30, 2020

(65) Prior Publication Data

US 2020/0249810 A1  Aug. 6, 2020

Related U.S. Application Data

(60) Provisional application No. 62/799,486, filed on Jan. 31, 2019.

(51) Int. Cl.
| | |
|---|---|
| *G05B 19/042* | (2006.01) |
| *G06F 3/0488* | (2022.01) |
| *G06F 3/048* | (2013.01) |
| *H02J 3/06* | (2006.01) |
| *H02J 50/00* | (2016.01) |

(52) U.S. Cl.
CPC ......... *G05B 19/042* (2013.01); *G06F 3/0488* (2013.01); *G05B 2219/23037* (2013.01); *G05B 2219/23258* (2013.01); *G05B 2219/23377* (2013.01); *G05B 2219/23378* (2013.01); *G06F 3/048* (2013.01); *H02J 3/06* (2013.01); *H02J 50/00* (2016.02)

(58) Field of Classification Search
None
See application file for complete search history.

(56) References Cited

PUBLICATIONS

"ABB Instruction Manual", 2018. (Year: 2018).*
"VAr-Min Intelligent Capacitor Control Operating Manual", 2015. (Year: 2015).*

* cited by examiner

*Primary Examiner* — Qing Yuan Wu
(74) *Attorney, Agent, or Firm* — Morse, Barnes-Brown & Pendleton, P.C.; Sean D. Detweiler, Esq.

(57) ABSTRACT

A system, method and apparatus for an interactive dynamic interface for wireless distributed capacitor control that comprises a touchscreen display that eliminates the conventional dials and switches that are part of a conventional control, and with these efficiencies can locally, remotely or autonomously implement "personality" settings for the capacitor control that speeds and simplifies custom configurations and recovery in relation to user, electrical and environmental input that meets certain operating criteria, including after a shut-down event, thereby improving the of the capacitor control system to function more appropriately, effectively, and efficiently under a greater range of parameters.

19 Claims, 38 Drawing Sheets

Today is Friday, January 11, 2019, The local time is 12:14:45 PM
This is the NeXVar(TM) 2019.0.000 Save Screen
PRESS HERE FOR THE
HOME SCREEN
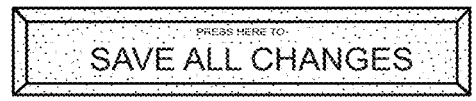
PRESS HERE TO
SAVE ALL CHANGES
PRESS HERE TO
CANCEL ALL CHANGES
FIG. 10

100

Today is Wednesday, January 9, 2019, The local time is 08:40:10 PM

This is the NeXVar(TM) 2019.0.000 Voltage Control Screen

| YOUR VOLTAGE CONTROL IS | DISABLED | YOUR TRIP VOLTAGE IS | 130 VAC |
| YOUR VOLTAGE CONTROL MODE IS | OVERRIDE | YOUR TRIP RELEASE VOLTAGE IS | 120 VAC |
| | | YOUR CLOSE RELEASE VOLTAGE IS | 110 VAC |
| YOUR SWITCHING DELAY TIME IS | 60 SEC | YOUR CLOSE VOLTAGE IS | 100 VAC |

PRESS HERE FOR THE
HOME SCREEN

PRESS HERE FOR THE
SET UP SCREEN

Today is Wednesday, January 9, 2019, The local time is 08:39:40 PM

This is the NeXVar(TM) 2019.0.000 Temperature Control Screen

| YOUR TEMPERATURE CONTROL IS | DISABLED | YOUR TRIP TEMPERATURE IS | 60 F |
| YOUR TEMPERATURE CONTROL MODE IS | PRIMARY | YOUR TRIP RELEASE TEMPERATURE IS | 70 F |
| YOUR SAMPLING SPAN IS | 30 MIN | YOUR CLOSE RELEASE TEMPERATURE IS | 80 F |
| YOUR SWITCHING DELAY TIME IS | 60 SEC | YOUR CLOSE TEMPERATURE IS | 90 F |

PRESS HERE FOR THE HOME SCREEN

PRESS HERE FOR THE SET UP SCREEN

Today is Wednesday, August 22, 2018, The local time is 5:21:20 PM

| This is the NeXVar(R) Set Up Screen 4 - Time of Day Override | | | |
|---|---|---|---|
| TIME OF DAY OVERRIDE CONTROL ENABLED ? | YES | YOUR FIRST TRIP TIME IS | 18:00 HOURS |
| THIS OVERRIDE CONTROL MODE IS | ENABLED | YOUR SECOND TRIP TIME IS | DISABLED |
| OPERATING DAYS | WEEKDAYS | YOUR FIRST CLOSE TIME IS | 06:00 HOURS |
| NON-OPERATING DAYS | WEEKENDS | YOUR SECOND CLOSE TIME IS | DISABLED |

PRESS HERE FOR THE
HOME SCREEN

PRESS HERE TO SAVE PARAMETERS AND GO TO THE
SET UP SCREEN 5

Today is Wednesday, August 22, 2018, The local time is 5:21:30 PM

This is the NeXVar(R) Set Up Screen 5 - VAR Override

VAR OVERRIDE CONTROL ENABLED ? | NO

THIS OVERRIDE CONTROL MODE IS | DISABLED

LINE CURRENT SENSOR TYPE | LINDSEY

VOLTAGE XFMR RATIO | 7200:120

KVAR TRIP SETPOINT | -100 KVAR

KVAR CLOSE SETPOINT | +300 KVAR

PRESS HERE FOR THE
HOME SCREEN

PRESS HERE TO SAVE PARAMETERS AND GO TO THE
SET UP SCREEN 6

Today is Wednesday, January 30, 2019, The local time is 04:38:36 PM

This is the NeXVar(TM) 2019.0.001 Capacitor Control History Screen

| DATE TIME | COMMAND |
|---|---|
| 2019-01-28 18:07:40 | CLOSE |
| 2019-01-28 18:10:30 | TRIP |
| 2019-01-30 08:51:57 | CLOSE |

PRESS HERE FOR THE
HOME SCREEN

PRESS HERE FOR THE NEXT
HISTORY SCREEN

| Personality Settings Matrix - NeXVar | |
|---|---|
| | |
| Personality Name/Customer | Default- Time/Volts |
| Personality Number | 0 |
| | |
| Re-Enter Password Timer | 5 minutes |
| Default Password (NONE = No Password) | Config_0 |
| | |
| Close Safety Timer Duration (CSTD) | 7 minutes |
| Ignore CSTD in Local Mode | No |
| Manual (Local) Close Delay | Disabled |
| Manual (Local) Trip Delay | Disabled |
| Remote (SCADA) Close Delay | Disabled |
| Remote (SCADA) Trip Delay | Disabled |
| Relay Pulse Duration | 10,000ms (10sec) |
| Local To Remote Delay | 0 Seconds |
| Restart Delay Timer | 0 |
| Amber LED flashing when any delay active | Disabled |
| | |
| Daily Close Count Limit (0 = Disabled) | 10 |
| | |
| Neutral Current Limit (0 = Disabled) | 0 |
| | |
| Voltage Control | |
| Trip Voltage | 129 |

FIG. 20A

| | |
|---|---|
| Trip Release Voltage | 124 |
| Close Release Voltage | 119 |
| Close Voltage | 115 |
| Switching Delay | 60 seconds |
| | |
| Temperature Control | |
| Trip Temperature | NA |
| Trip Release Temperature | NA |
| Close Release Temperature | NA |
| Close Temperature | NA |
| Switching Delay | 60 seconds |
| | |
| Time of Day Control | |
| Weekday Close TOD 1 | 6:00 |
| Weekday Trip TOD 1 | 9:00 |
| Weekday Close TOD 2 | 16:00 |
| Weekday Trip TOD 2 | 21:00 |
| Weekend Close TOD 1 | 6:00 |
| Weekend Trip TOD 1 | 9:00 |
| Weekend Close TOD 2 | 16:00 |
| Weekend Trip TOD 2 | 21:00 |
| | |

FIG. 20A CONT.

| | |
|---|---|
| VAr Control | |
| Voltage XFMR Ratio | NA |
| Trip KVAr | -350 |
| Trip Release KVAr | -150 |
| Close Release KVAr | 200 |
| Close KVAr | 400 |
| Switching Delay | 60 seconds |
| | |
| SEASONS | |
| Season 1 Start Date | 1/1 |
| Season 1 Control Algorithm | Time |
| Season 1 Override Algorithm | Voltage |
| Season 2 Start Date | None |
| Season 2 Control Algorithm | None |
| Season 2 Override Algorithm | None |
| Season 3 Start Date | None |
| Season 3 Control Algorithm | None |
| Season 3 Override Algorithm | None |
| Season 4 Start Date | None |
| Season 4 Control Algorithm | None |
| Season 4 Override Algorithm | None |

FIG. 20A CONT.

| Personality Settings Matrix - NeXVar | |
|---|---|
| | |
| Personality Name/Customer | Var/Voltage |
| Personality Number | 1 |
| | |
| Re-Enter Password Timer | 5 minutes |
| Default Password (NONE = No Password) | Config_1 |
| | |
| Close Safety Timer Duration (CSTD) | 7 minutes |
| Ignore CSTD in Local Mode | No |
| Manual (Local) Close Delay | Disabled |
| Manual (Local) Trip Delay | Disabled |
| Remote (SCADA) Close Delay | Disabled |
| Remote (SCADA) Trip Delay | Disabled |
| Relay Pulse Duration | 10,000ms (10sec) |
| Local To Remote Delay | 0 Seconds |
| Restart Delay Timer | 0 |
| Amber LED flashing when any delay active | Disabled |
| | |
| Daily Close Count Limit (0 = Disabled) | 10 |
| | |
| Neutral Current Limit (0 = Disabled) | 0 |
| | |
| Voltage Control | |
| Trip Voltage | 129 |

FIG. 20B

| | |
|---|---|
| Trip Release Voltage | 124 |
| Close Release Voltage | 119 |
| Close Voltage | 115 |
| Switching Delay | 60 seconds |
| | |
| Temperature Control | |
| Trip Temperature | NA |
| Trip Release Temperature | NA |
| Close Release Temperature | NA |
| Close Temperature | NA |
| Switching Delay | 60 seconds |
| | |
| Time of Day Control | |
| Weekday Close TOD 1 | NA |
| Weekday Trip TOD 1 | NA |
| Weekday Close TOD 2 | NA |
| Weekday Trip TOD 2 | NA |
| Weekend Close TOD 1 | NA |
| Weekend Trip TOD 1 | NA |
| Weekend Close TOD 2 | NA |
| Weekend Trip TOD 2 | NA |
| | |

FIG. 20B CONT.

| | |
|---|---|
| VAr Control | |
| Voltage XFMR Ratio | 7200:120 |
| Trip KVAr | -100 |
| Trip Release KVAr | -50 |
| Close Release KVAr | 200 |
| Close KVAr | 300 |
| Switching Delay | 60 seconds |
| | |
| SEASONS | |
| Season 1 Start Date | 1/1 |
| Season 1 Control Algorithm | Var |
| Season 1 Override Algorithm | Voltage |
| Season 2 Start Date | None |
| Season 2 Control Algorithm | None |
| Season 2 Override Algorithm | None |
| Season 3 Start Date | None |
| Season 3 Control Algorithm | None |
| Season 3 Override Algorithm | None |
| Season 4 Start Date | None |
| Season 4 Control Algorithm | None |
| Season 4 Override Algorithm | None |

FIG. 20B CONT.

| Personality Settings Matrix - NeXVar | |
| --- | --- |
| | |
| Personality Name/Customer | Voltage |
| Personality Number | 2 |
| | |
| Re-Enter Password Timer | 5 minutes |
| Default Password (NONE = No Password) | Config_2 |
| | |
| Close Safety Timer Duration (CSTD) | 7 minutes |
| Ignore CSTD in Local Mode | No |
| Manual (Local) Close Delay | Disabled |
| Manual (Local) Trip Delay | Disabled |
| Remote (SCADA) Close Delay | Disabled |
| Remote (SCADA) Trip Delay | Disabled |
| Relay Pulse Duration | 10,000ms (10sec) |
| Local To Remote Delay | 0 Seconds |
| Restart Delay Timer | 0 |
| Amber LED flashing when any delay active | Disabled |
| | |
| Daily Close Count Limit (0 = Disabled) | 10 |
| | |
| Neutral Current Limit (0 = Disabled) | 0 |
| | |
| Voltage Control | |
| Trip Voltage | 129 |

FIG. 20C

| | |
|---|---|
| Trip Release Voltage | 124 |
| Close Release Voltage | 119 |
| Close Voltage | 115 |
| Switching Delay | 60 seconds |
| | |
| Temperature Control | |
| Trip Temperature | NA |
| Trip Release Temperature | NA |
| Close Release Temperature | NA |
| Close Temperature | NA |
| Switching Delay | 60 seconds |
| | |
| Time of Day Control | |
| Weekday Close TOD 1 | NA |
| Weekday Trip TOD 1 | NA |
| Weekday Close TOD 2 | NA |
| Weekday Trip TOD 2 | NA |
| Weekend Close TOD 1 | NA |
| Weekend Trip TOD 1 | NA |
| Weekend Close TOD 2 | NA |
| Weekend Trip TOD 2 | NA |
| | |

FIG. 20C CONT.

| | |
|---|---|
| VAr Control | |
| Voltage XFMR Ratio | NA |
| Trip KVAr | NA |
| Trip Release KVAr | NA |
| Close Release KVAr | NA |
| Close KVAr | NA |
| Switching Delay | 60 seconds |
| | |
| SEASONS | |
| Season 1 Start Date | 1/1 |
| Season 1 Control Algorithm | Voltage |
| Season 1 Override Algorithm | None |
| Season 2 Start Date | None |
| Season 2 Control Algorithm | None |
| Season 2 Override Algorithm | None |
| Season 3 Start Date | None |
| Season 3 Control Algorithm | None |
| Season 3 Override Algorithm | None |
| Season 4 Start Date | None |
| Season 4 Control Algorithm | None |
| Season 4 Override Algorithm | None |

FIG. 20C CONT.

| Personality Settings Matrix - NeXVar | |
|---|---|
| | |
| Personality Name/Customer | Temperature |
| Personality Number | 3 |
| | |
| Re-Enter Password Timer | 5 minutes |
| Default Password (NONE = No Password) | Config_3 |
| | |
| Close Safety Timer Duration (CSTD) | 7 minutes |
| Ignore CSTD in Local Mode | No |
| Manual (Local) Close Delay | Disabled |
| Manual (Local) Trip Delay | Disabled |
| Remote (SCADA) Close Delay | Disabled |
| Remote (SCADA) Trip Delay | Disabled |
| Relay Pulse Duration | 10,000ms (10sec) |
| Local To Remote Delay | 0 Seconds |
| Restart Delay Timer | 0 |
| Amber LED flashing when any delay active | Disabled |
| | |
| Daily Close Count Limit (0 = Disabled) | 10 |
| | |
| Neutral Current Limit (0 = Disabled) | 0 |
| | |
| Voltage Control | |
| Trip Voltage | NA |

FIG. 20D

| | |
|---|---|
| Trip Release Voltage | NA |
| Close Release Voltage | NA |
| Close Voltage | NA |
| Switching Delay | 60 seconds |
| | |
| Temperature Control | |
| Trip Temperature | 60 F |
| Trip Release Temperature | 70 F |
| Close Release Temperature | 80 F |
| Close Temperature | 90 F |
| Switching Delay | 60 seconds |
| | |
| Time of Day Control | |
| Weekday Close TOD 1 | NA |
| Weekday Trip TOD 1 | NA |
| Weekday Close TOD 2 | NA |
| Weekday Trip TOD 2 | NA |
| Weekend Close TOD 1 | NA |
| Weekend Trip TOD 1 | NA |
| Weekend Close TOD 2 | NA |
| Weekend Trip TOD 2 | NA |
| | |

FIG. 20D CONT.

| | |
|---|---|
| VAr Control | |
| Voltage XFMR Ratio | NA |
| Trip KVAr | NA |
| Trip Release KVAr | NA |
| Close Release KVAr | NA |
| Close KVAr | NA |
| Switching Delay | 60 seconds |
| | |
| SEASONS | |
| Season 1 Start Date | 1/1 |
| Season 1 Control Algorithm | Temperature |
| Season 1 Override Algorithm | None |
| Season 2 Start Date | None |
| Season 2 Control Algorithm | None |
| Season 2 Override Algorithm | None |
| Season 3 Start Date | None |
| Season 3 Control Algorithm | None |
| Season 3 Override Algorithm | None |
| Season 4 Start Date | None |
| Season 4 Control Algorithm | None |
| Season 4 Override Algorithm | None |

FIG. 20D CONT.

| Personality Settings Matrix - NeXVar | |
|---|---|
| | |
| Personality Name/Customer | SCADA |
| Personality Number | 4 |
| | |
| Re-Enter Password Timer | 5 minutes |
| Default Password (NONE = No Password) | Config_4 |
| | |
| Close Safety Timer Duration (CSTD) | 7 minutes |
| Ignore CSTD in Local Mode | No |
| Manual (Local) Close Delay | 60 Seconds |
| Manual (Local) Trip Delay | Disabled |
| Remote (SCADA) Close Delay | 60 Seconds |
| Remote (SCADA) Trip Delay | Disabled |
| Relay Pulse Duration | 10,000ms (10sec) |
| Local To Remote Delay | 2 Minutes |
| Restart Delay Timer | 0 |
| Amber LED flashing when any delay active | Enabled |
| | |
| Daily Close Count Limit (0 = Disabled) | 10 |
| | |
| Neutral Current Limit (0 = Disabled) | 10A |
| | |
| Voltage Control | |
| Trip Voltage | NA |

FIG. 20E

| | |
|---|---|
| Trip Release Voltage | NA |
| Close Release Voltage | NA |
| Close Voltage | NA |
| Switching Delay | 60 seconds |
| | |
| Temperature Control | |
| Trip Temperature | NA |
| Trip Release Temperature | NA |
| Close Release Temperature | NA |
| Close Temperature | NA |
| Switching Delay | 60 seconds |
| | |
| Time of Day Control | |
| Weekday Close TOD 1 | NA |
| Weekday Trip TOD 1 | NA |
| Weekday Close TOD 2 | NA |
| Weekday Trip TOD 2 | NA |
| Weekend Close TOD 1 | NA |
| Weekend Trip TOD 1 | NA |
| Weekend Close TOD 2 | NA |
| Weekend Trip TOD 2 | NA |
| | |

FIG. 20E CONT.

| | |
|---|---|
| VAr Control | |
| Voltage XFMR Ratio | NA |
| Trip KVAr | NA |
| Trip Release KVAr | NA |
| Close Release KVAr | NA |
| Close KVAr | NA |
| Switching Delay | 60 seconds |
| | |
| SEASONS | |
| Season 1 Start Date | 1/1 |
| Season 1 Control Algorithm | SCADA |
| Season 1 Override Algorithm | None |
| Season 2 Start Date | None |
| Season 2 Control Algorithm | None |
| Season 2 Override Algorithm | None |
| Season 3 Start Date | None |
| Season 3 Control Algorithm | None |
| Season 3 Override Algorithm | None |
| Season 4 Start Date | None |
| Season 4 Control Algorithm | None |
| Season 4 Override Algorithm | None |

FIG. 20E CONT.

| Personality Settings Matrix - NeXVar | |
| --- | --- |
| | |
| Personality Name/Customer | Test Mode |
| Personality Number | 32767 |
| | |
| Re-Enter Password Timer | Disabled |
| Default Password (NONE = No Password) | NONE |
| | |
| Close Safety Timer Duration (CSTD) | 30 Seconds |
| Ignore CSTD in Local Mode | No |
| Manual (Local) Close Delay | 5 Seconds |
| Manual (Local) Trip Delay | Disabled |
| Remote (SCADA) Close Delay | Disabled |
| Remote (SCADA) Trip Delay | Disabled |
| Relay Pulse Duration | 5000ms (5sec) |
| Local To Remote Delay | 0 Seconds |
| Restart Delay Timer | 5000 |
| Amber LED flashing when any delay active | Enabled |
| | |
| Daily Close Count Limit (0 = Disabled) | 0 |
| | |
| Neutral Current Limit (0 = Disabled) | 0 |
| | |
| Voltage Control | |
| Trip Voltage | 129 |

FIG. 20F

| | |
|---|---|
| Trip Release Voltage | 124 |
| Close Release Voltage | 119 |
| Close Voltage | 115 |
| Switching Delay | 60 seconds |
| | |
| Temperature Control | |
| Trip Temperature | 60 F |
| Trip Release Temperature | 70 F |
| Close Release Temperature | 80 F |
| Close Temperature | 90 F |
| Switching Delay | 60 seconds |
| | |
| Time of Day Control | |
| Weekday Close TOD 1 | 6:00 |
| Weekday Trip TOD 1 | 9:00 |
| Weekday Close TOD 2 | 16:00 |
| Weekday Trip TOD 2 | 21:00 |
| Weekend Close TOD 1 | 6:00 |
| Weekend Trip TOD 1 | 9:00 |
| Weekend Close TOD 2 | 16:00 |
| Weekend Trip TOD 2 | 21:00 |
| | |

FIG. 20F CONT.

| | |
|---|---|
| VAr Control | |
| Voltage XFMR Ratio | NA |
| Trip KVAr | -350 |
| Trip Release KVAr | -150 |
| Close Release KVAr | 200 |
| Close KVAr | 400 |
| Switching Delay | 60 seconds |
| | |
| SEASONS | |
| Season 1 Start Date | 1/1 |
| Season 1 Control Algorithm | Voltage |
| Season 1 Override Algorithm | Temperature |
| Season 2 Start Date | None |
| Season 2 Control Algorithm | None |
| Season 2 Override Algorithm | None |
| Season 3 Start Date | None |
| Season 3 Control Algorithm | None |
| Season 3 Override Algorithm | None |
| Season 4 Start Date | None |
| Season 4 Control Algorithm | None |
| Season 4 Override Algorithm | None |

FIG. 20F CONT.

INTERACTIVE DYNAMIC INTERFACE FOR CAPACITOR CONTROL

RELATED APPLICATIONS

This application claims priority to, and the benefit of, U.S. Provisional Application No. 62/799,486 filed Jan. 31, 2019 for all subject matter contained in said application. The disclosure of said provisional application is hereby incorporated herein by reference in its entirety.

FIELD OF THE INVENTION

The present invention relates to system, method and apparatus for an interactive dynamic interface capacitor control system for wireless distributed capacitor control suitable for implementing for operation by utilities and in smart grid applications. In particular, the present invention relates to interactive dynamic interface wireless distributed capacitor control that comprises a touchscreen display that eliminates the conventional dials and switches that are part of a conventional control. The technological advancement of the present invention creates efficiencies that enable local, remote, or autonomous implementation of "personality" or profile settings for the capacitor control that speed and simplify custom configurations and recovery in relation to user, electrical and environmental input that meets certain operating criteria, including after a shut-down event. The capacitor control system is enabled to function more appropriately, effectively, and efficiently under a greater range of parameters in useful ways that could not be configured in prior mechanical and electronic switching capacitor control systems.

BACKGROUND

Generally, modern utility distribution infrastructure includes a variety of instruments such as capacitor bank controllers and related devices that operate as components in integrated or centralized control systems for the distribution of electrical power. Such instruments are increasingly employed to develop smart grid networks to improve infrastructure performance through functions such as increasing efficiency, optimizing voltage, reducing powerline losses, automating control functions, improving fault detection, reducing restoration events, synchronizing and integrating functions, improving reliability flexibility, and reducing costs of distribution management by active, integrated monitoring, balancing, control and adjustment.

However, this technology experiences some shortcomings. Control, monitoring, and analysis instruments such as capacitor bank controls or similar devices service powerline networks and electricity distribution infrastructures, often being mounted on powerline poles or at electrical utility substations. When such instruments experience failures, need servicing, or otherwise must be adjusted or changed in the field, they present significant hazards to technicians or users. Many times, they must be accessed in adverse environmental conditions including poor visibility, darkness, rain, snow, ice, or adverse temperatures. This compounds the danger to operators and maintenance personnel, technicians, users, and all personnel, posed by the imminent hazards or conditions experienced whenever working around high voltages including death, severe personal injury, and instrument or equipment damage. Climbing utility poles, accessing powerlines, and substations, or other related field work is dangerous, difficult, and time consuming, and not always effective. Therefore, efforts need to be made to make utility distribution safer, more responsive, and more effective.

SUMMARY

There is a need for a capacitor control system unit ("CCU") that minimizes user interaction time and effort, thereby reducing exposure to adverse environments and conditions that enables technicians or users to change settings with fewer operations or manual inputs (to reprogram capacitor control units and devices) and that minimizes the need for manipulation of physical controls to allow for settings to be changed remotely without accessing physical components (including conventional dials and switches) inside the protective enclosure. Moreover, there is a need for such a system to alter or switch between settings and profiles dynamically upon occurrence of environmental or other operating criteria or conditions to increase the scope of conditions under which the control operates appropriately, effectively, and efficiently. The present invention is directed toward further solutions to address this need, in addition to having other desirable characteristics.

Specifically, the interactive dynamic interface for wireless distributed capacitor control and system comprise a powerful, flexible, and expandable solution for wireless distributed capacitor control providing functionality not previously attainable with conventional controllers. The interactive dynamic interface provides users with an interactive touch screen display that eliminates the conventional dials and switches that are part of a conventional control, and with these efficiencies can locally, remotely or autonomously implement "personality" settings for the capacitor control that speeds and simplifies custom configurations. This instrument also comprises: a core of 7 configurable analog, 4 digital status inputs, and a dedicated AC line voltage measurement (AN7) that is accurate to +/−1% @ 120 VAC and permits autonomous programmable voltage override capability. The instrument can also transmit data from an intelligent electronic device (IED), or smart meter via its RS-232 serial communications port. The CCU includes an Ethernet port so that it is also network ready. The capacitor control is configured to be compatible with other smart grid components and technology. With the installation of a 2-Way transceiver the NeXGen CCU communicates with distributed capacitor control SCADA programs via DNP3 or MODBUS protocols. The interactive dynamic interface wireless distributed capacitor control can execute standalone capacitor control functions in the absence of 2-way communications, or as a back up to distributed (SCADA) control via one of the following methods: Autonomous Voltage Control, Autonomous Temperature Control, Autonomous Time of Day Control, and Autonomous Var Control.

In accordance with example embodiments of the present invention an interactive dynamic interface system for wireless distributed capacitor control comprises a protective enclosure. An interactive touch screen display performs the functions of knobs and dials for adjustment and alteration of system using operations including autonomous voltage control, autonomous temperature control, autonomous time of day control, and autonomous var control. The touch screen display is in electronic communication with a printed circuit board having a processor and memory configured to provide capacitor control. A power supply powered by an internal transformer from an external supply-line voltage electrically communicates and connects to the printed circuit board, and the printed circuit board is in electronic communication with a core of configurable analog inputs and digital status inputs; a stab socket mount with a utility pole bracket mount; multiple LED status indicators; and connectors for communications, compression terminal blocks for field terminations. The interactive dynamic interface system provides control personality settings for capacitor control that simplifies custom configurations and profiles dynamically upon occurrence of operating criteria or user input through the interactive dynamic interface system that is performed by at least one of local, remote or autonomous operation input.

In accordance with aspects of the present invention, the protective enclosure comprises a polycarbonate enclosure.

In accordance with aspects of the present invention, the interactive dynamic interface system further includes wireless connectivity.

In accordance with aspects of the present invention, the interactive touch screen is provided on an Intelligent Electronic Device for controlling the capacitor remotely.

In accordance with aspects of the present invention, the stab socket mount is a four-stab socket. In other aspects, the stab socket is a six-stab socket.

In accordance with aspects of the present invention, a home screen of the interactive dynamic interface wireless distributed capacitor control recalls and displays system historical events and enables a user to proceed with configuration of alternate parameters.

In accordance with aspects of the present invention, a set-up screen of the interactive dynamic interface wireless distributed capacitor control enables a user to configure capacitor control comprising autonomous voltage control, autonomous temperature control, autonomous time of day control, and autonomous var control.

In accordance with aspects of the present invention, a set-up screen of the interactive dynamic interface wireless distributed capacitor control enables a user to configure capacitor control including selection of a control personality setting.

In accordance with example embodiments of the present invention, an interactive dynamic interface capacitor control comprises a protective enclosure; a touch screen display in electronic communication with a printed circuit board. The printed circuit board is in electronic communication with a stab socket mount with a utility pole bracket mount; multiple LED status indicators; connectors for communications, communication ports, compression terminal blocks for field terminations; analog inputs, digital inputs, status inputs; and a power supply connected to a network of external power distribution components.

In accordance with aspects of the present invention, the protective enclosure may comprise a polycarbonate enclosure.

In accordance with aspects of the present invention, the interactive dynamic interface capacitor control may be configured to operate in a smart grid of powerlines comprising at least one supply-line voltage.

In accordance with aspects of the present invention, the interactive dynamic interface capacitor control further includes wireless connectivity.

In accordance with aspects of the present invention, the interactive touch screen is provided on an Intelligent Electronic Device for controlling the capacitor remotely.

In accordance with aspects of the present invention, the stab socket mount is a four-stab socket. In other aspects, the stab socket is a six-stab socket.

In accordance with aspects of the present invention, a home screen of the interactive dynamic interface wireless distributed capacitor control recalls and displays system historical events and enables a user to proceed with configuration of alternate parameters.

In accordance with aspects of the present invention, a set-up screen of the interactive dynamic interface wireless distributed capacitor control enables a user to configure capacitor control comprising autonomous voltage control, autonomous temperature control, autonomous time of day control, and autonomous var control.

In accordance with aspects of the present invention, a set-up screen of the interactive dynamic interface wireless distributed capacitor control enables a user to configure capacitor control including selection of a control personality setting.

In accordance with example embodiments of the present invention, a method of operating an interactive dynamic interface system for capacitor control is provided. The method includes providing an interactive dynamic interface for capacitor control as set forth herein, accessing the interactive dynamic interface system, navigating a home screen provided on the touch screen display, configuring capacitor control using a set-up screen provided on touch screen, saving configuration using a save screen provided on touch screen; and implementing the saved capacitor control configuration.

In accordance with aspects of the present invention, the method further includes entering a password to access the system using a password screen provided on the touch screen.

In accordance with aspects of the present invention, configuring capacitor control comprises selecting a control personality for capacitor control.

In accordance with aspects of the present invention, configuring capacitor control comprises configuring at least one of autonomous voltage control, autonomous temperature control, autonomous time of day control, and autonomous var control.

BRIEF DESCRIPTION OF THE FIGURES

These and other characteristics of the present invention will be more fully understood by reference to the following detailed description in conjunction with the attached drawings, in which:

FIG. 10 is an illustrative example of an interactive dynamic interface display Save Screen;

FIG. 14 is an illustrative example of an interactive dynamic interface display Set Up Screen for Voltage Control;

FIG. 15 is an illustrative example of an interactive dynamic interface display Set Up Screen for Temperature Control;

FIG. 16 is an illustrative example of an interactive dynamic interface display Set Up Screen for Time of Day Control;

FIG. 17 is an illustrative example of an interactive dynamic interface display Var Override Screen;

FIG. 19 is an illustrative example of an interactive dynamic interface display Capacitor Control History Screen;

FIGS. 20A, 20B, 20C, 20D, 20E, 20F are various embodiments of Personality Settings for the system;

DETAILED DESCRIPTION

Figure 1:
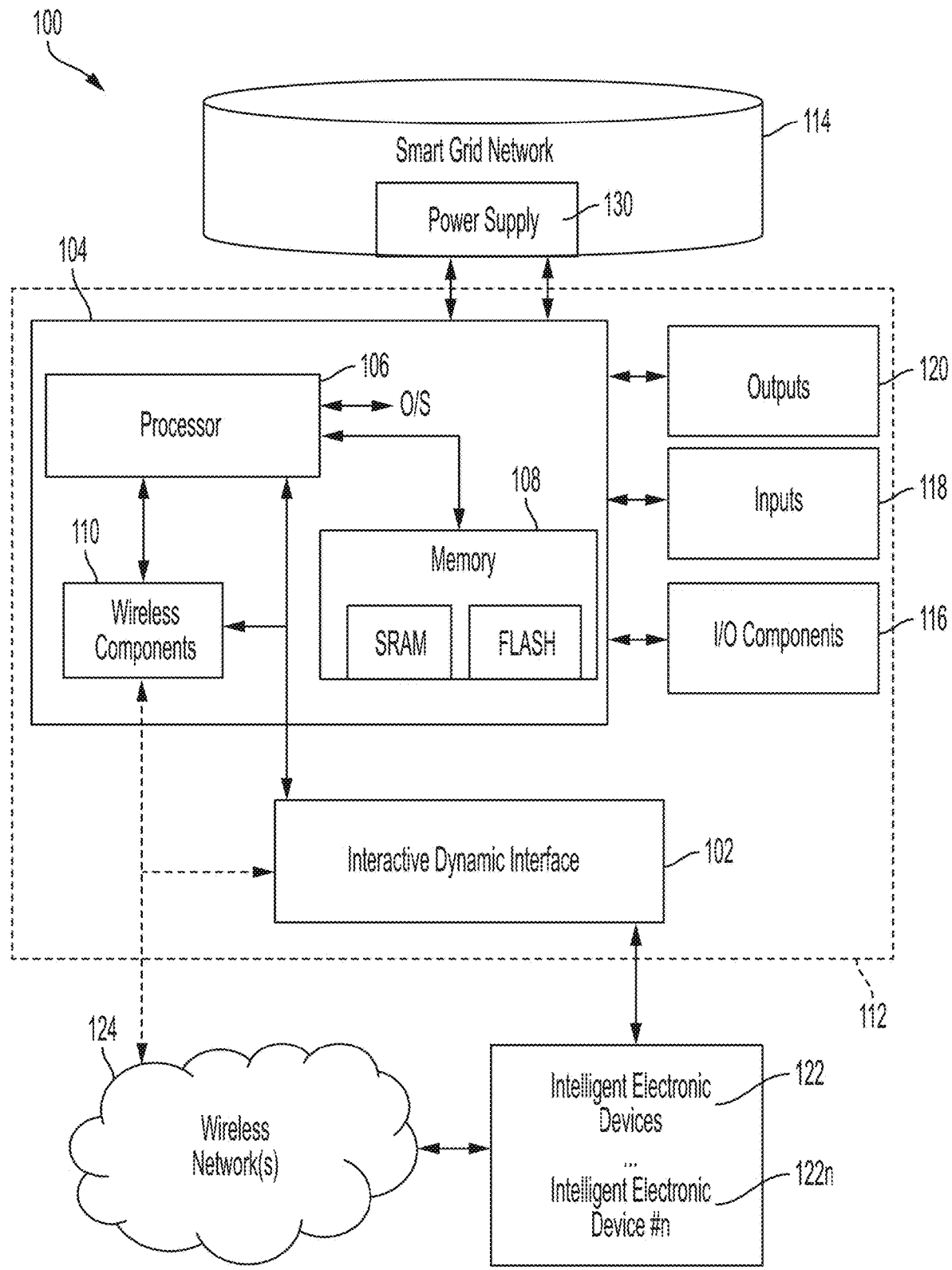
FIG. 1 is a diagrammatic illustration of a system for implementation of the present invention.

An illustrative embodiment of the present invention relates to a system, method, and interactive dynamic interface apparatus for wireless distributed capacitor control that is suitable for implementations including operation by utilities and in smart grid applications. The present invention relates to an interactive dynamic interface wireless distributed capacitor control that comprises a touchscreen display that eliminates the conventional dials and switches that are part of a conventional control. The technological advancement of the present invention creates efficiencies that enable local, remote, or autonomous implementation of "personality" or profile settings for the capacitor control that speed, simplify, and expand custom configurations and recovery in relation to user, electrical and environmental input that meets certain operating criteria, including after a shut-down event. The capacitor control system is enabled to function more appropriately, effectively, and efficiently under a greater range of parameters. The interactive dynamic interface wireless distributed capacitor control provides autonomous control capabilities and can execute standalone capacitor control functions in the absence of 2-way communications, or as a back up to distributed (SCADA) control via one of the following methods: Autonomous Voltage Control, Autonomous Temperature Control, Autonomous Time of Day Control, and Autonomous Var Control.

FIGS. 1 through 22, wherein like parts are designated by like reference numerals throughout, illustrate an example embodiment or embodiments of a system 100, method 600, and interactive dynamic interface apparatus for wireless distributed capacitor control, according to the present invention. Although the present invention will be described with reference to the example embodiment or embodiments illustrated in the figures, it should be understood that many alternative forms can embody the present invention. One of skill in the art will additionally appreciate different ways to alter the parameters of the embodiment(s) disclosed, such as the size, shape, or type of elements or materials, in a manner still in keeping with the spirit and scope of the present invention.

FIG. 1 depicts a diagrammatic illustration of an interactive dynamic interface wireless distributed capacitor control system 100 for implementation of the present invention. The system 100 may be configured with a variety of physical specifications. In one example, the system 100 provides an interactive dynamic interface 102 that may comprise a touch screen for a user to supply input to the capacitor control, however the interface 102 may also take the form of a display on an intelligent electronic device 122 operated by a user. The interface 102 may or may not be physically attached to a printed circuit board 104, but is always at least in electronic communication with the circuit board 104. The circuit board 104 is housed in a protective enclosure 112 and connected to the external smart grid network 114 where equipment to be controlled reside (e.g. for power distribution across powerlines), and from which external components may act as a power supply 130 for the instrument. The printed circuit board 104 of the capacitor control system 100 contains at least one Processor 106 that functions in conjunction with memory 108 attached to the circuit board 104 or otherwise electrically connected to provide the autonomous capacitor control of the system 100. Wireless components 110 allow the processor 106 to interact with additional components (including various user devices). The power supply 130 may comprise at least one 120 VAC Input, connected through a 10"×10"×6" NEMA 4× Enclosure 112 and 4 or six-stab Socket or Pole Mount components. The interactive dynamic interface 102 wireless distributed capacitor control system 100 can be embodied in either a 4 or six-stab socket mount, that may also be embodied in a utility pole mount enclosure style. Several additional I/O components 116 are also typically included. Operating Voltages may vary from 95-150 VAC at 60 Hz or 190-250 VAC at 50 Hz. Surge withstanding capabilities meet or exceed the requirements of ANSI C62.41-2002, and Electrostatic Discharge parameters comply with IEC 61000-4-2 @ 15 kV. The low cost of the system 100, which can be, for example, the NEXVAR by Telescada, allows for economic use of flexible capacitor control automation using wired or wireless (local or remote) communications comprising the use of inputs 118 and outputs 120. Remote Communication serial ports are Ethernet and RS-232 type and are configurable for any type of UHF/VHF/900 MHz, or Cellular Communications. Local interrogation and programming of the system 100 via dropdown lists in the Windows Based NeXGen NGC Utility software requires no programming knowledge. Example Remote Communications components comprise one (1) Ethernet communication port with Default IP address 192.168.1.120, Router ID 192.168.1.1, Default Mask 255.255.255.0 and Default Port 2300; one (1) RS-232 serial communication port. Configurable baud rates up to 38.4 kbps. Connectors for serial communications ports are RJ-12 3-wire type. DNP3.0, Modbus RTU/ASCII Protocols installed and are configurable. Example Local Communications components comprise server assignable ports where 2 servers can operate simultaneously, including: one (1) USB B-Type serial maintenance port for "LOCAL" interrogation, System 100 database programming and data transfer; one (1) Proprietary RS-232 (RJ45) Firmware port for loading firmware; and are Configurable USB1 and IED1 baud rates up to 38.4 kbps, where the Connector for IED1 port is of the 3-wire RJ-12 type. Interrogation, database programming and data transfer via USB1 or IED1 is achieved using Telescada NeXGen NGC Utility Software. The capacitor control may be configured with a variety of Feature Sets. For example, Analog Inputs 118 may comprise four (4) 0-5 VDC Analog Inputs for External Voltage/Current Transducers, eight (8) 0-10 VAC Analog Inputs for External Neutral Current Sensors, one (1) Single Phase AC Line Voltage Input with +/−1% accuracy at 120 VAC and also Data Recording on Each Input. Digital Inputs 118 may comprise four (4) Optically Isolated Digital Inputs with Data Recording on Each Input. Also, Control Relays may comprise two (2) rated 30 A at 240 VAC, with Configurable OPEN/CLOSE timing, Configurable Safety Timer, Configurable OPEN/CLOSE Local Delay, Digital Counter with Data Recording. A Temperature Sensor may be configured as a TTT-1 Ambient Temperature Transducer. Communications components further may comprise one (1) USB (B-Type) Comm. Port (Local), one (1) RS-232 COM1 Comm. Port (Local or remote), one (1) Ethernet Communication Port, DNP3.0 and MODBUS Protocols (programmable—one active).

Figure 2:
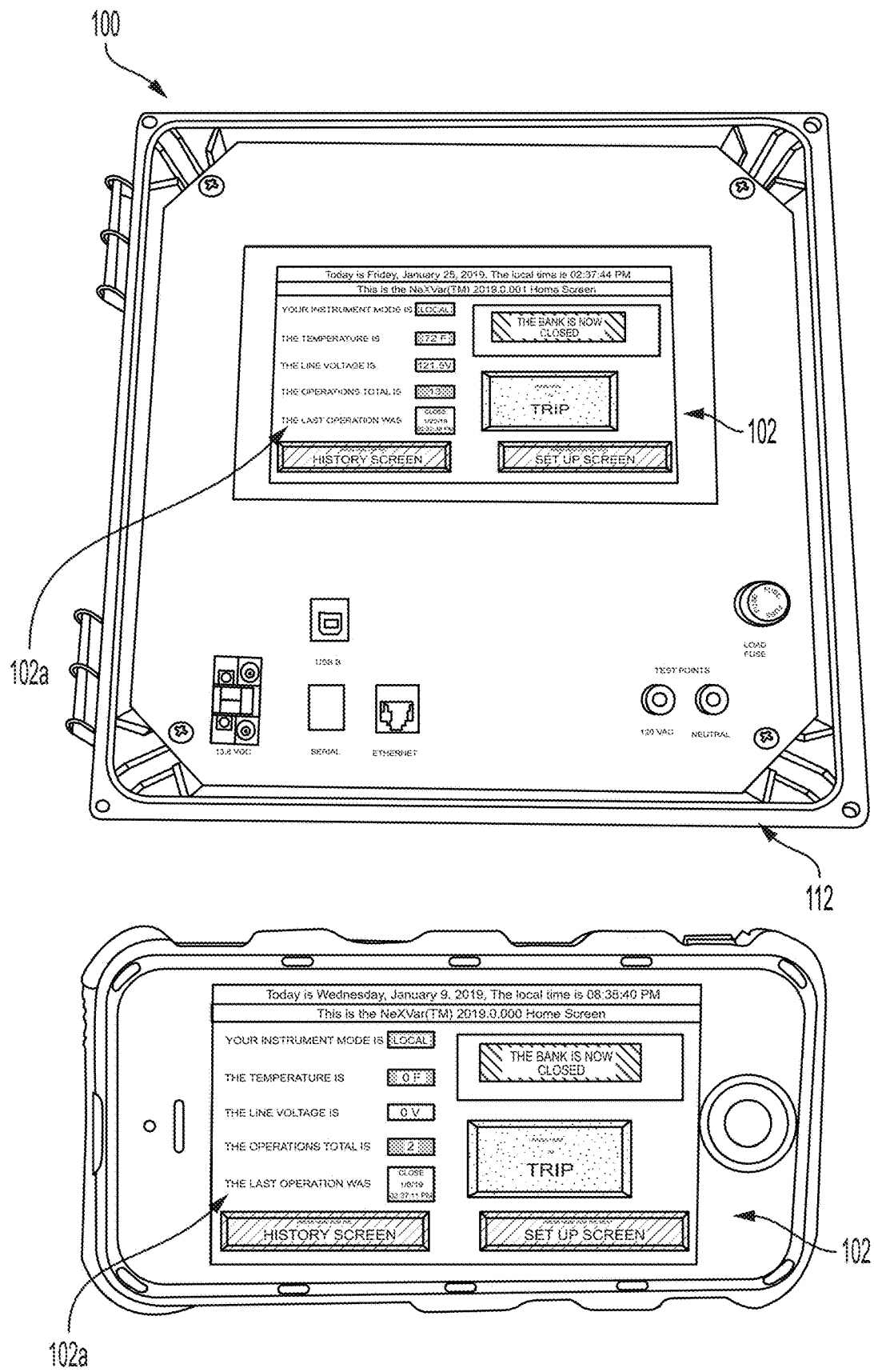
FIG. 2 is an illustrative example of an interface touch screen display.

FIG. 2 is an illustrative example of an interface touch screen display 102a, of an interactive dynamic interface 102, which may be attached to a face plate of the capacitor control, itself connected to both the printed circuit board 104 and protective enclosure 112. An alternative embodiment depicted therein may provide an interface touch screen display 102a, of an interactive dynamic interface 102, which may be attached to remote communications devices used to interact with and program the capacitor control remotely.

Figure 3:
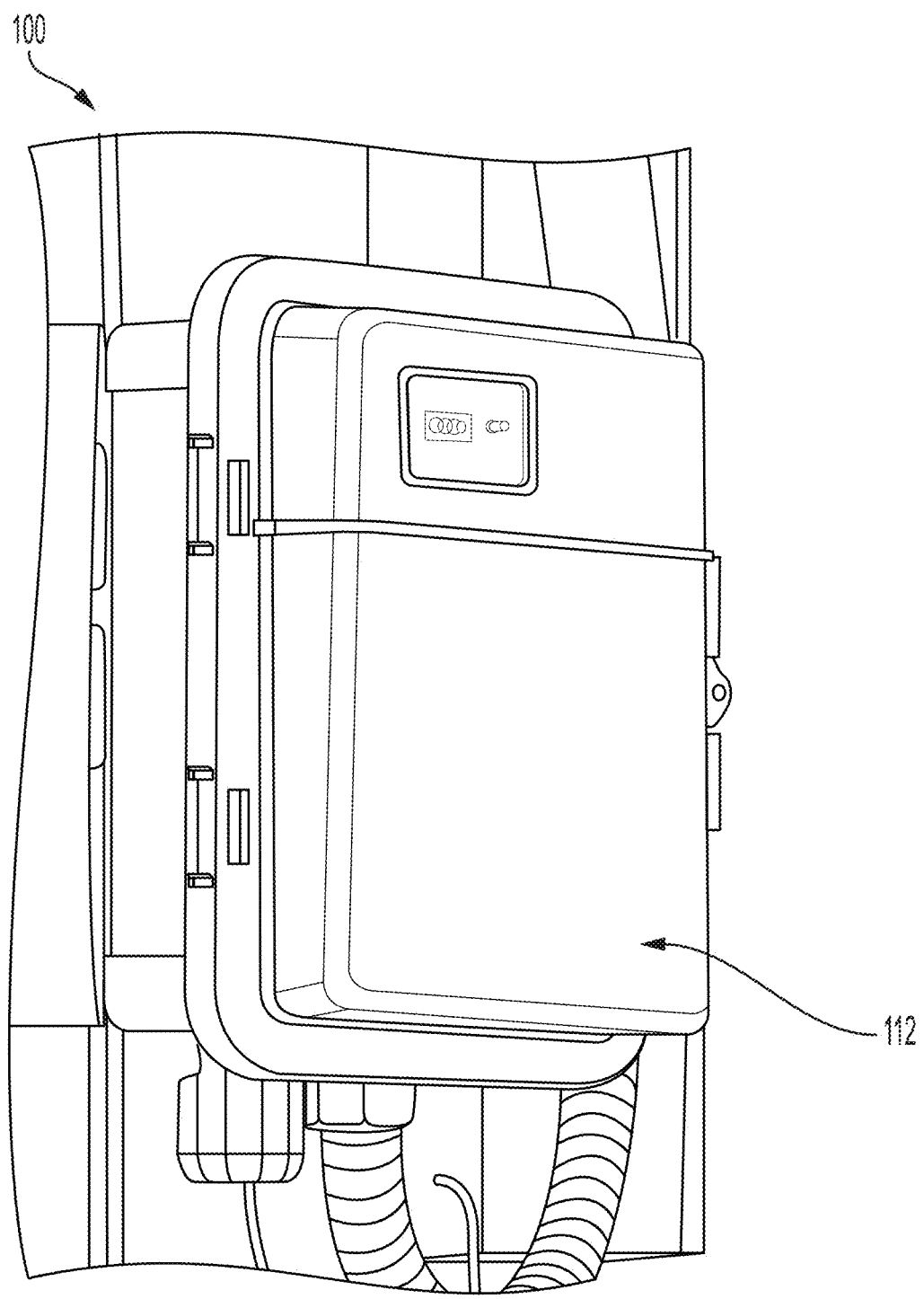
FIG. 3 is an illustrative example of a pole mounted protective enclosure for the control.

FIG. 3 depicts an illustrative example of a pole mounted protective enclosure 112 for the capacitor control. An example system 100, which can be, for example, the NEXVAR by Telescada, is housed in a NEMA 4 protective polycarbonate enclosure 112 measuring 10 inches in height, 10 inches in width, 6 inches in depth, and comprises at least one of each of the following: a 4-Stab Socket Mount, a 6-Stab Socket Mount, Utility Pole Bracket Mount, Multiple light emitting diode (LED) status indicators—including sealed external LED, Standard USB B-Type for local interrogation and configuration, Standard RJ-12 connectors for communications. Local Controls & Feedback Indicators may include at least one High Brightness External RED/GREEN/YELLOW State Indicator LED, at least one High Brightness External Fault LED (YELOW). On the main PCB motherboard, at least one Local TRIP/CLOSE Pushbuttons (Local mode), at least one Local SCADA Lock-Out Switch (Local mode), and at least one Optional Mechanical Counter (counts close operations). Each COM port includes RX and TX lights. #14 Compression Terminal Blocks are provided for field terminations—analogs, status inputs and power. All field termination locations are clearly labeled on the PCB 104 and enclosure cover 112. The system 100 employs spring-based compression terminals for all inputs that securely contain all input wires prior to powering up the instrument. The interactive dynamic interface wireless distributed capacitor control polycarbonate enclosure 112 is designed for outdoor use and the capacitor control is acceptable to the relevant regulatory authorities having legal jurisdiction over installation. Environmental Operating Conditions provide an operating temperature range of −40° to +60° C., a storage temperature range of −40° to +60° C., and a humidity range of 5% to 95%, non-condensing.

Figure 4:
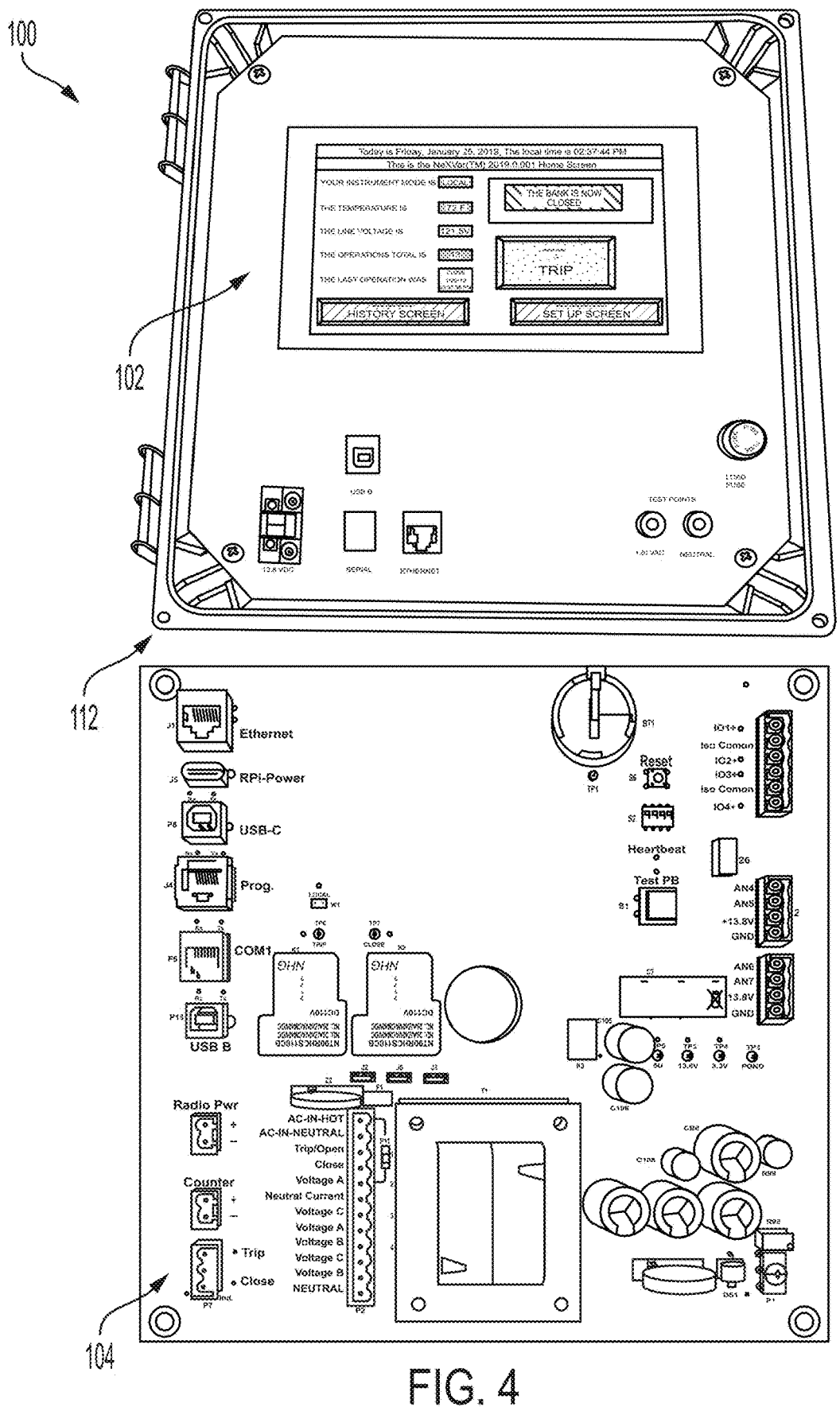
FIG. 4 is an illustrative example of a circuit board mounting and configuration within a protective enclosure.

FIG. 4 depicts an illustrative example of a circuit board 104 mounting and configuration within a protective enclosure 112. The processor 106 and memory 108 may come in a variety of configurations and types known to a person having ordinary skill in the art. For example, the core module processor 106 is the R3000 operating at 22 MHz. Memory 108 comprises: FLASH: 1 MB; SRAM: 512k; Serial Flash Memory: 4 MB; Battery Backed RTC (Real Time Clock); and Watchdog timer. Analog Inputs for the capacitor control may vary in number. An example capacitor control may include four (4) analog inputs of 0-5 VDC nominal, comprising current input with adapter board, data recording on each channel, statistical data recording (min-max-average), and event reporting on each channel with accuracy—0.1% of full scale where analog connectors have +5 VDC and VBatt+ (13.8 VDC) for sensor loop power and there is 20 K ohm input impedance—ESD protected. The instrument may comprise eight (8) analog inputs of 0-10 VAC, Data recording on each channel, Statistical data recording (min-max-ave), and Event reporting on each channel, with defined Accuracy—0.1% of full scale, Analog connectors have +5 VDC and VBatt+(13.8 VDC) for sensor loop power, and 330 K ohm input impedance—ESD protected. The at least one External/Internal Temperature Sensor may be of a Telescada P/N TTT-1type with typical error @ 25 deg. C. (77 deg. F.) of 0.5 deg. C. (−1 deg. F.). The worst case being 1 deg. C. Rated over −40 deg. C. (−40 deg. F.) to 125 deg. C. (257 deg. F.) with a max error over that range of 3 deg. C. Digital (Status) Inputs may comprise four (4) Digital Inputs with data recording on each channel and event reporting on each channel. Wetted (pulled up to 13.8 VDC by 2.7K ohms)—Appropriate for dry relay contacts. Digital Inputs are internally pulled up to 13.8 VDC via 2.7K ohms. Digital inputs are ESD protected.

External Digital Inputs may comprise connector pins labeled STATUS IN 0, 1, 2, 3 are external digital inputs. These 4 inputs are protected from surges and pulled up to +13.8 VDC by 2.7K ohm resistors. Capacitor Bank Control Relays comprise at least one (1) TRIP Control Relay and at least one (1) CLOSE Control Relay that is SPST semi-sealed and rated for 30 A @ 240 VAC. Relays possess Configurable OPEN/CLOSE contact closure times, Configurable Safety Timer (Close Lockout). Available is a Digital Counter with Data Recording.

The system 100 has 3 serial interfaces for local and remote communications. Serial interfaces are USB serial interfaces configured using the Telescada NeXGen NGC Configuration Software. The COM1 serial interfaces on the printed circuit board 104 are standard 6 position modular jacks (RJ12). The mating 6 position modular plug: Tyco Electronics P/N 5-555176-3, or equal. When using remote serial communications, such as digital radio, digital cellular, digital fiber optic transceivers communications devices may be plugged into the Comm 1Port. Serial communications are programmed using the configuration software, NGC. Most remote communications devices are plugged in to the COM1 port. There may be many different configurations providing different combinations of one or more components supporting local/programming/serial port functionalities. Typically, the Serial port programming functions are accomplished using the Telescada NeXGen NGC Configuration Software. A USB B-Type connector allows for a standard USB B-Type to A-Type cable.

Figure 5:
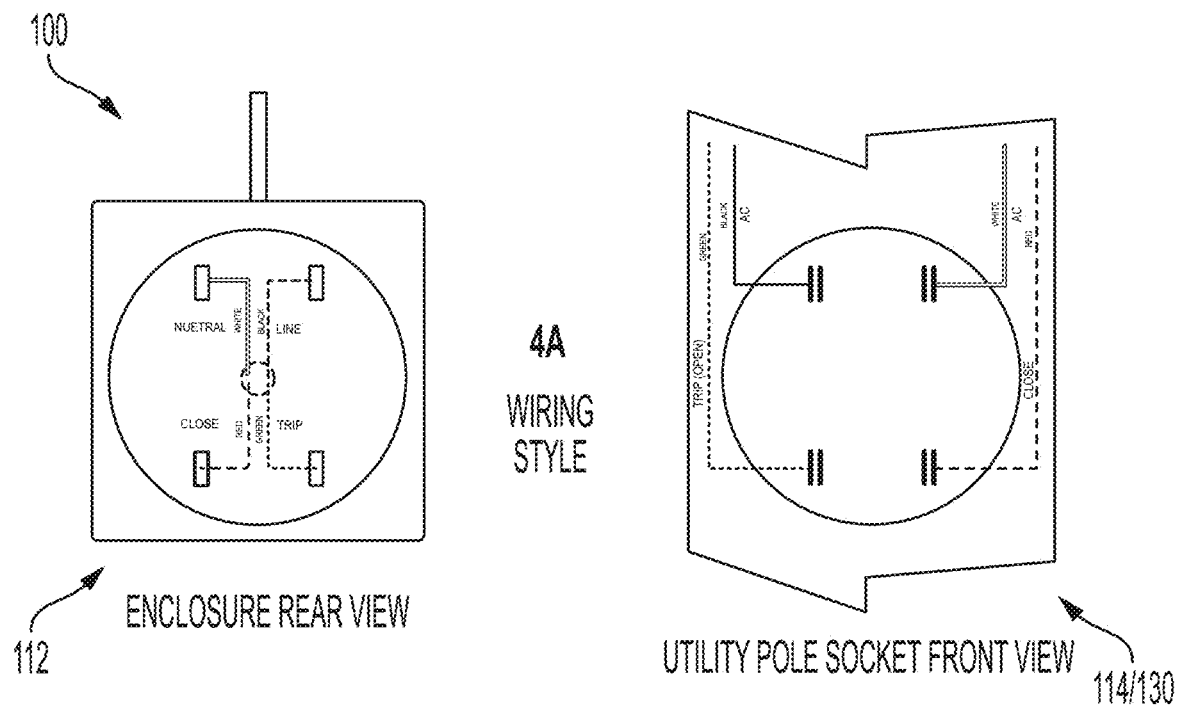
FIG. 5 is a diagrammatic illustration of a capacitor control 4A Wiring Diagram.
Figure 6:
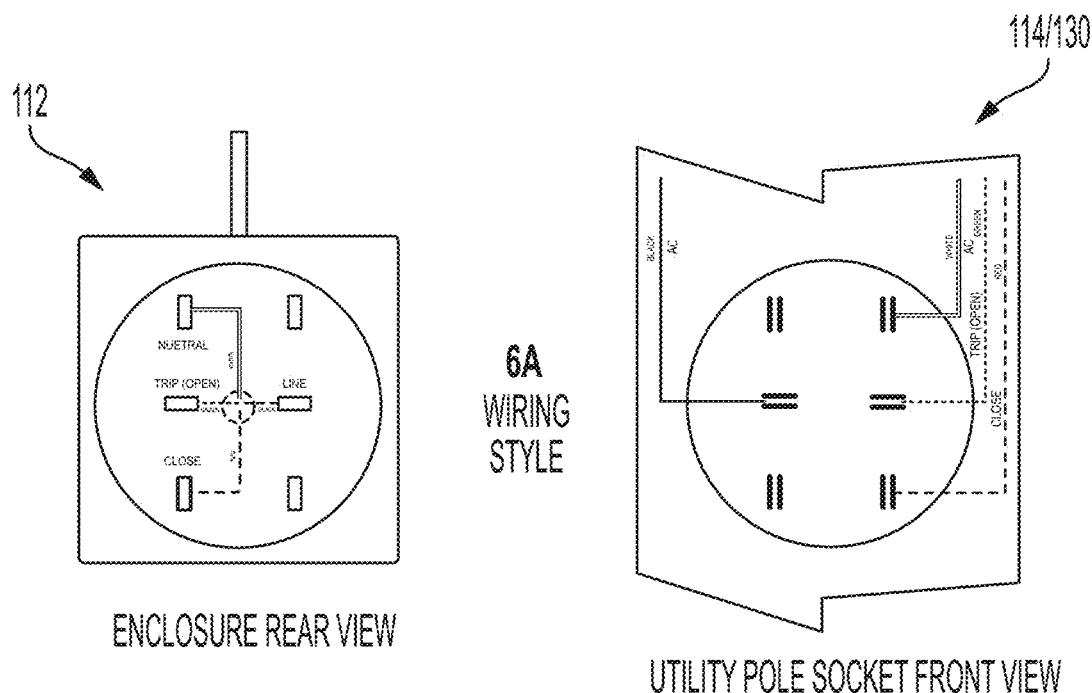
FIG. 6 is a diagrammatic illustration of a capacitor control 6A Wiring Diagram.
Figure 7:
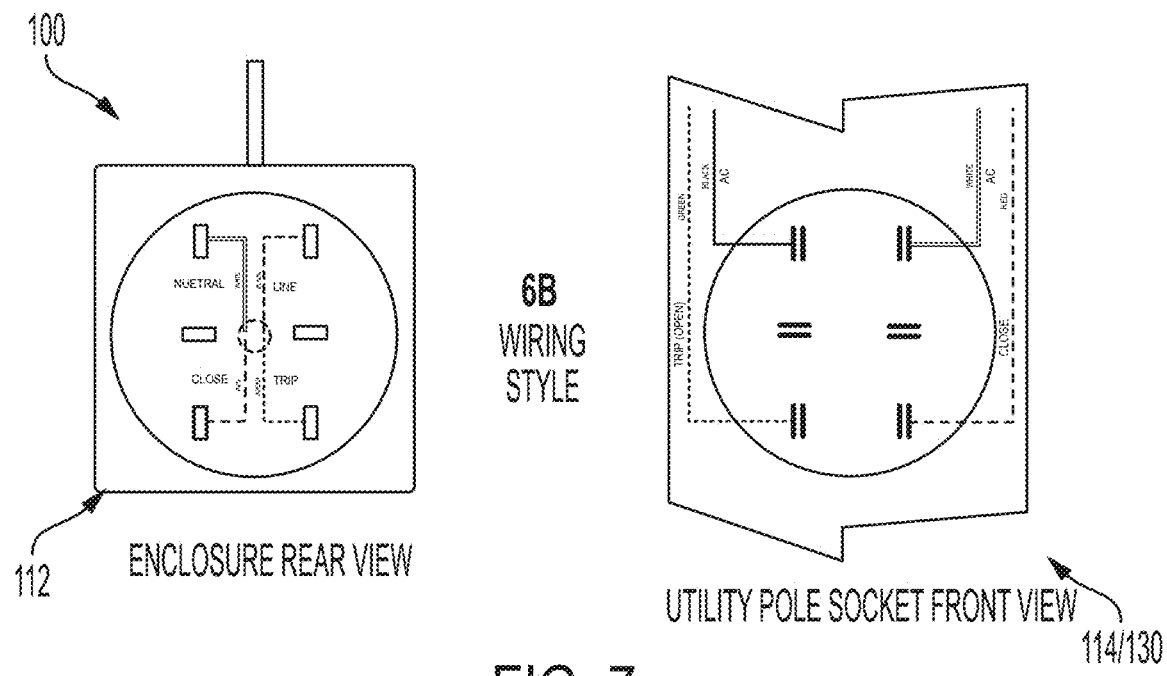
FIG. 7 is a diagrammatic illustration of a capacitor control 6B Wiring Diagram.
Figure 8:
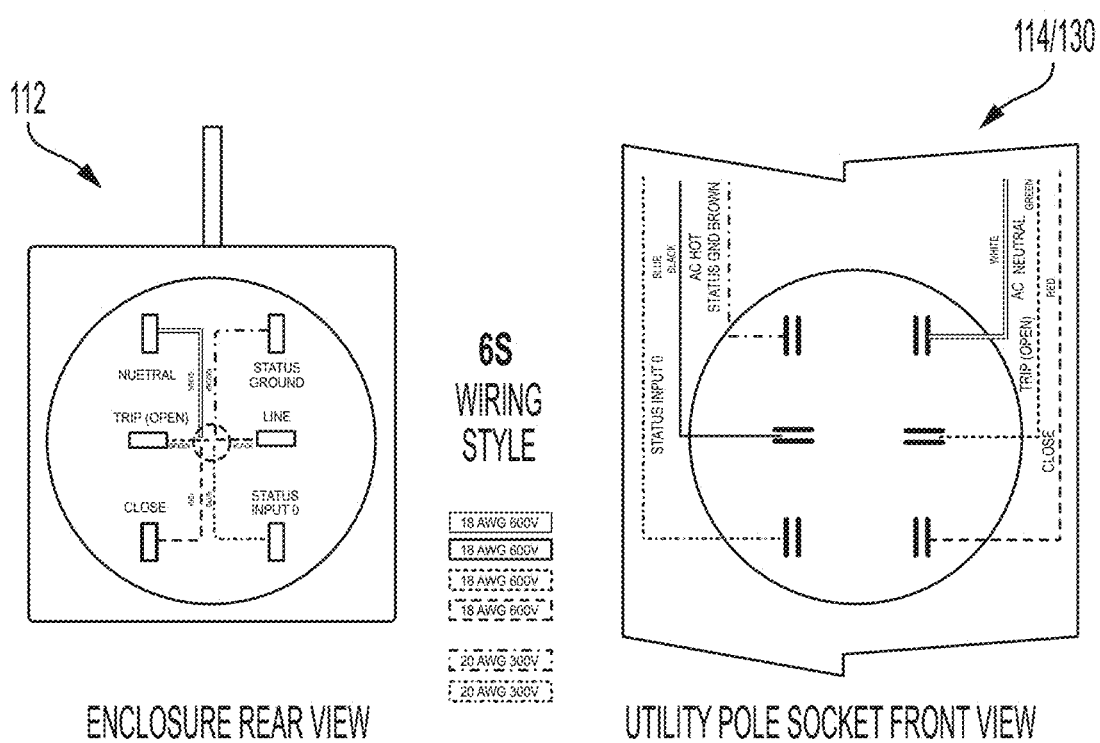
FIG. 8 is a diagrammatic illustration of a capacitor control 6S Wiring Diagram.

Instrument Connection for the system 100 may incorporate a variety of configurations. Typically, the system 100 is supplied by the factory in either a 4/six-stab socket mount, or utility pole mount enclosure style. The following wiring diagrams describe the most popular wiring styles; however, the system 100 can be wired to meet the specific needs of the individual utility. As non-limiting examples, FIG. 5 depicts a diagrammatic illustration of a system 100 4A Wiring Diagram; FIG. 6 depicts a diagrammatic illustration of a system 100 6A Wiring Diagram; FIG. 7 depicts a diagrammatic illustration of a system 100 6B Wiring Diagram; and FIG. 8 depicts a diagrammatic illustration of a system 100 6S Wiring Diagram. A variety of Power Supplies may be used for the system 100. For example, the system 100 may be powered by an internal transformer from a 120 VAC external supply-line voltage with input power—85-135 VAC (120 VAC Nominal) that is always on when power is applied. Such a power supply 130 possesses short circuit protection via resettable fuse in 120 VAC circuits. Available are 3.3 VDC, 5 VDC and 13.8 VDC operating power supplies. 13.8 VDC is brought out to "+" and "−" terminals to power external communications devices, e.g. radios, modems, etc. The example power supply 130 would be configured for a 10 W maximum input supply draw. In an example input power configuration, the system 100 is powered by an on-board transformer and multiple DC power supplies. Input voltage for the interactive dynamic interface wireless distributed capacitor control is 85-135 VAC (120 VAC nominal). The system 100 is always-on when powered, i.e. there is no need for a power switch. The external AC power supply 130 is kept within the proper range for the instrument and polarity of the wiring matches that indicated on the terminal block and offers transient voltage protection. The system 100 is protected by a metal-oxide varistor located between the 120 VAC input HOT and NEUTRAL lines. The varistor is located on the Motherboard PCB. The system 100 circuit board 104 is protected by a resettable fuse located on the CCU printed circuit board 104. The input voltage is connected to the internal power supplies through a resettable fuse. If the input current exceeds the fuse current rating the fuse will open. Resettable fuses take some time to recover and the example fuse is allotted 30 minutes for fuse recovery once the input voltage is removed.

In many instances the system 100 is not connected to an earth ground. If a ground connection is desired, the system 100 enclosure 112 can be connected to earth ground using a braided cable or heavy solid copper conductor, where the ground wire must be the largest gauge of all wires used for field termination. A 12 AWG green and yellow wire is recommended. For spring-based compression terminals the maximum wire gauge is 12 AWG.

The system 100 may comprise serial connections of various types. The system 100 has 3 serial interfaces for local and remote communications. Serial interfaces are RS-232 type and USB. Serial interfaces are configured using the Telescada NeXGen NGC Configuration Software.

The at least one COM1 serial interface on the system 100 printed circuit board 104 comprises standard 6 position modular jacks (RJ12). The mating 6 position modular plug: Tyco Electronics P/N 5-555176-3, or equal.

The system 100 may provide a capacitor control Local Port Pin-Out (for PCB revision A through D). The system 100 serial port programming functions are accomplished using the Telescada NeXGen NGC Configuration Software. The capacitor control Local/Programming Port is labeled as USB. This port defaults to 9600 baud 8,N,1. A local programming terminal, (a.k.a. laptop computer), is typically connected to USB. This port can also be used as a digital radio interface or a modem port if the modem is programmed so that it does not require AT commands or hardware handshaking lines. Note: Looking into the connector, Pin 1 is on the right.

The system 100 may include a capacitor control IED Port 1 Pin-Out. The IED 1 port is a 3-wire implementation using a modular RJ-12 jack with RS-232 signal levels. IED 1 Port defaults to 9600 baud, and no hardware handshaking, but parameters to change its baud rate can be set using Telescada NeXGen NGC Configuration Software. The System 100 R Test pushbutton is used for remote field diagnostics and instrument configuration. The System 100 R Test Pushbutton is a large square yellow button located on the right side of the PCB and labeled as "TEST PB".

The capacitor control processor "Reset" Pushbutton is used to reset the system 100 processor 106. The reset button is a small white round momentary switch located on the center left of CCU printed circuit board 104. The system 100 Test Pushbutton, when depressed momentarily, will send a message from the instrument core processor 106, to the Local/Serial Port. This message can be used to identify the system 100 address. If the system 100 is connected to a PC or Laptop running the NGC configuration software, the NeXGen core processor will send a message to NGC with the instrument's programmed address and some configuration information. Holding down the Test Pushbutton for ten (10) seconds or longer will default the capacitor control core processor 106 and reset the instrument to local address #1 and set all parameters to their default settings. The interactive dynamic interface wireless distributed capacitor control system 100 has a number of LED indicators to quickly visually confirm instrument systems operations and health status. Additionally, the system 100 has a series of PCB jumpers to help in configuring the capacitor control for your specific application and make for easier bench top testing. For example, P17—Safety Timer Interlock is a 3-pin header that requires a jumper. If the jumper shorts pin 1 and 2 of P17, the safety timer interlock is enforced. The safety timer interlock blocks the signal from the CLOSE momentary switch. The safety timer interlock duration is determined by the system 100 database setting. If P17 pin 2 and 3 are shorted, the safety timer interlock will be defeated. The CLOSE pushbutton might cause the close relay to operate immediately. The actual behavior is determined by the NEXVAR database. The safety timer is designed to prevent a charged capacitor from being connected to the distribution line. Industry standard capacitor banks include a bleeder resistor that allows the capacitor to discharge in 5 minutes. Local Close Operation Function Selector. The W3 jumper installed causes close signals from the CLOSE pushbutton to be routed to the close control circuit and allows the pushbutton to control the close relay. If the safety timer interlock is active, the pushbutton will not operate the relay. The W3 jumper removed causes the close pushbutton signal to be blocked. In this case the processor 106 generates the local close signal. The processor 106 generated close signal duration is defined in the system 100 database. The safety timer rules are in force. W4 (revision E and later only)—Local Trip Operation Function Selector. The W4 jumper installed causes trip signals from the TRIP pushbutton to be routed to the trip control circuit and allows the pushbutton to control the close relay. The safety timer interlock has no effect on the trip circuits. The W4 jumper removed causes the pushbutton trip signal to be blocked. In this case the processor 106 generates the local trip signal. The processor generated 106 trip signal duration is defined in the system 100 database. The safety timer has no effect on trip. Other Jumper settings include W2 that connects the "0-10 VAC1" input connectors to AN 5.

Importantly the system 100 can execute standalone capacitor control functions in the absence of 2-way communications, or as a back up to distributed (SCADA) control via one of the following methods: Autonomous Voltage Override Control; Autonomous Temperature Control; Autonomous Time of Day Control; and Autonomous Var Control.

Figure 9A:
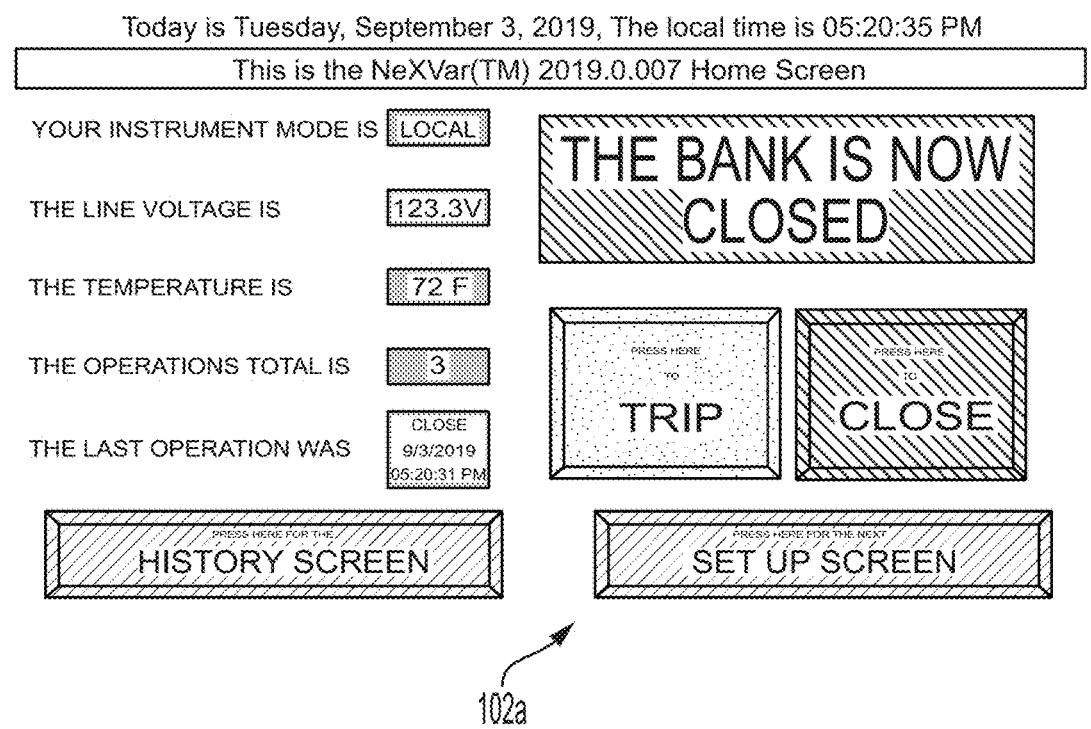
FIG. 9A is an illustrative example of an interactive dynamic interface display Home Screen when the system is in a closed condition.
Figure 9B:
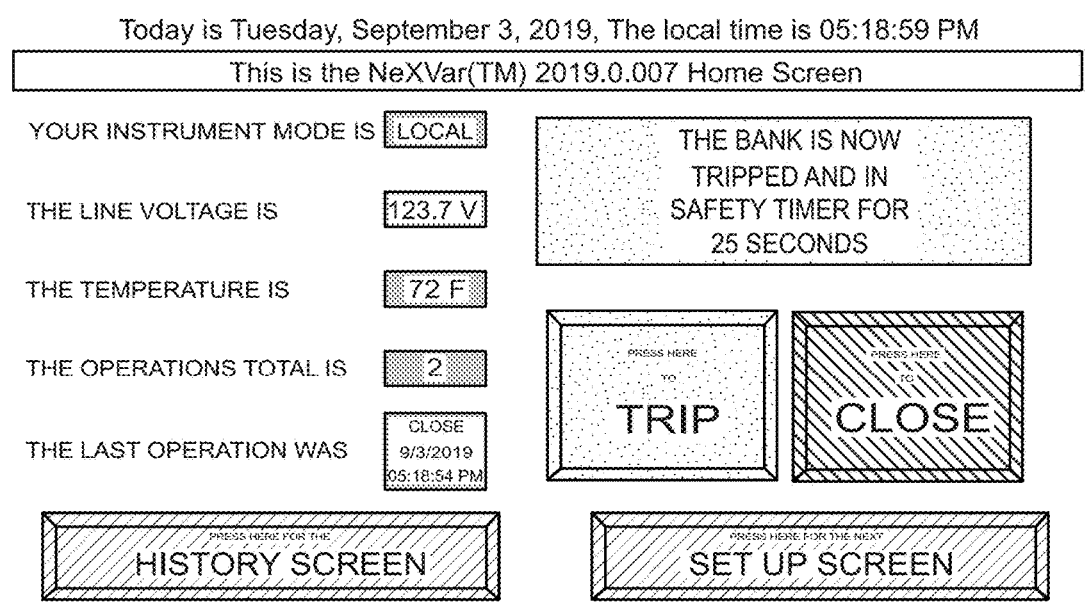
FIG. 9B is an illustrative example of an interactive dynamic interface display Home Screen when the system is in a tripped condition with a safety tier countdown.

FIGS. 9A and 9B depict illustrative examples of a Home Screen of an interactive dynamic interface touch screen display 102a of the system 100. The Home Screen touch screen display 102a provides clear intuitive control over the primary functions of the capacitor control. From the Home Screen touch screen display 102a the user can manually TRIP, or CLOSE the capacitor bank, as well as view the status of the system 100. FIG. 9A depicts the home screen touch screen display 102a in a closed condition. FIG. 9B depicts the home screen touch screen display 102a in a tripped condition with a safety timer countdown. The user can also recall system 100 historical events and proceed with configuration of alternate parameters.

FIG. 10 depicts an illustrative example of interactive dynamic interface touch screen display Save Screen 102b. With each successive screen choice, the interactive dynamic interface touch screen display will always prompt the user to Save All Changes, Cancel All Changes, or return to the Home Screen touch screen display 102a.

Figure 11:
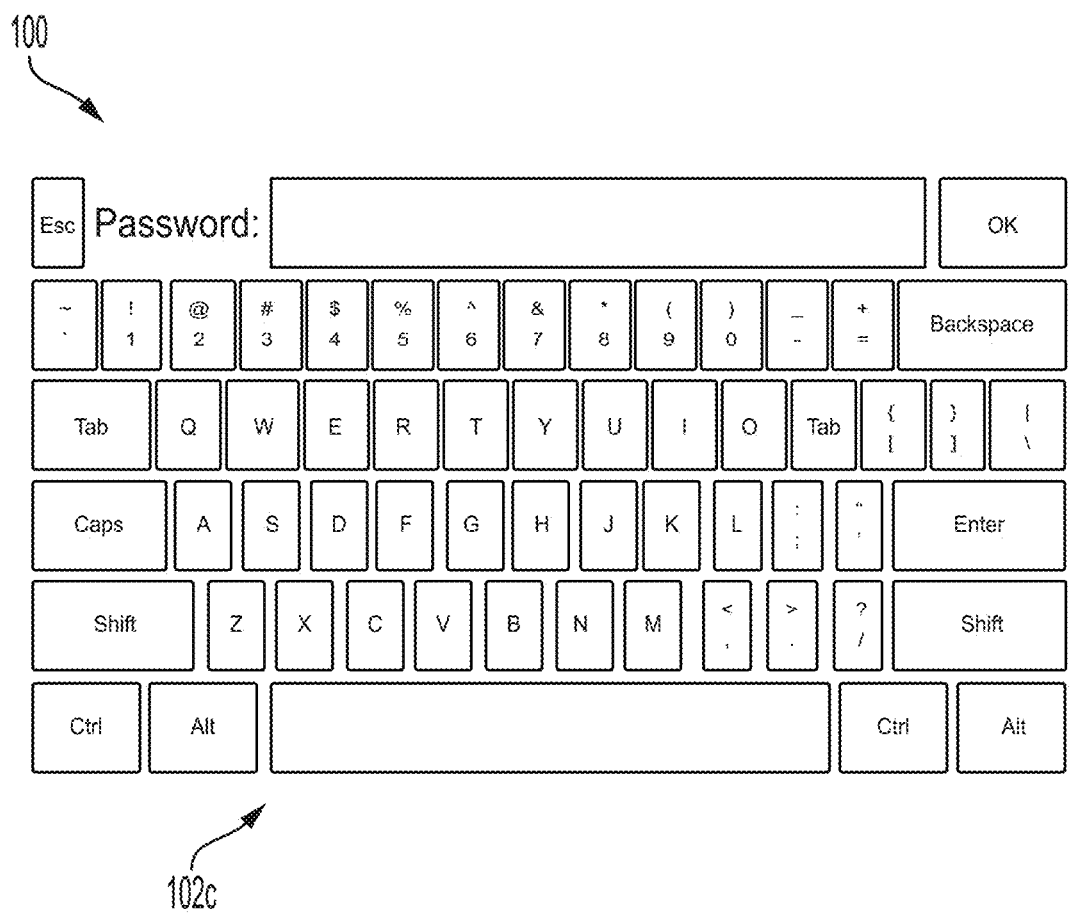
FIG. 11 is a diagrammatic illustration of an interactive dynamic interface display Password Screen.

FIG. 11 depicts a diagrammatic illustration of a capacitor control interactive dynamic interface touch screen display Password Screen 102c. The interactive dynamic interface touch screen display Password Screen 102c provides user configurable secure access to the capacitor control. When the password function is enabled, the user is prompted to enter a password for access to the full functionality and programmability of the capacitor control.

Figure 12:
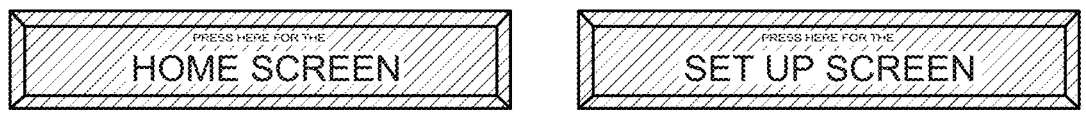
FIG. 12 is a diagrammatic illustration of an interactive dynamic interface display Set Up Screen.

FIG. 12 depicts a diagrammatic illustration of a capacitor control interactive dynamic interface touch screen display Set Up Screen 102d. The interactive dynamic interface touch screen display Set Up Screen 102d provides user configurable access to the capacitor control primary parameters. From this screen the user views and adjusts the behavior of some common capacitor control functions. For user convenience there are a series of common pre-programmed "personalities" into the interactive dynamic interface wireless distributed capacitor control. By choosing the users desired personality the ease of configuration is simplified and speed of configuration is drastically reduced.

Figure 13:
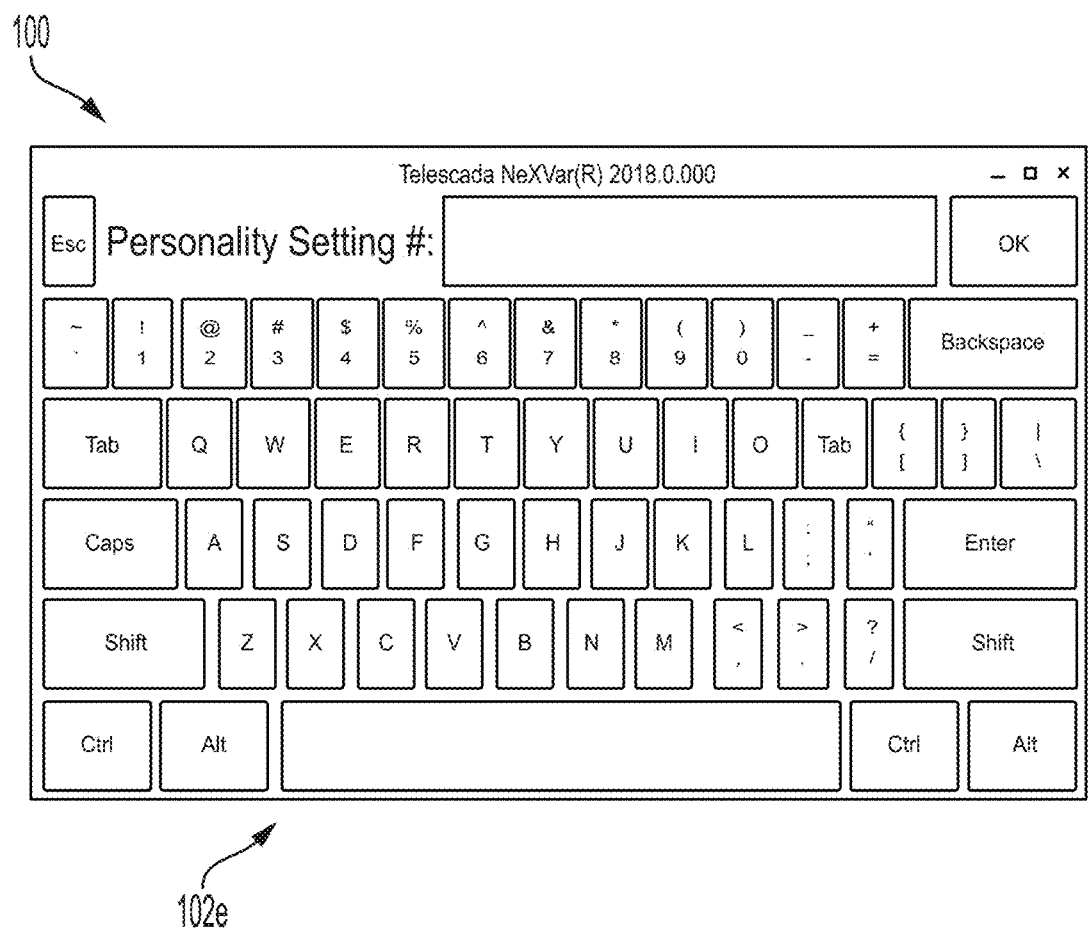
FIG. 13 is a diagrammatic illustration of an interactive dynamic interface display Selecting the Control "Personality" with the On Screen Keyboard.

FIG. 13 depicts a diagrammatic illustration of a capacitor control interactive dynamic interface touch screen display of the system 100 during selection of a control personality with the on-screen keyboard personality selection screen 102e. The on-screen keyboard provides user configurable access to the capacitor control primary parameters. From this screen the user can view and adjust the behavior of some common capacitor control functions. With a single click, a series of pre-programmed control personalities for the instrument can be reviewed and chosen. By choosing the users desired control personality, the ease of configuration is simplified, and speed of configuration is drastically reduced.

FIG. 14 depicts an illustrative example of a capacitor control interactive dynamic interface touch screen display Set Up Screen 2—Voltage Control screen 102f. The interactive dynamic interface touch screen display Voltage Control Screen 102f provides user configurable access to the capacitor control Voltage Control parameters. From this screen the user can view and adjust the voltage control behavior of the capacitor control system 100. For user convenience there are a series of pre-programmed common control personalities into the capacitor control. By choosing the users desired control personality the ease of configuration is simplified and speed of configuration is drastically reduced. The capacitor control autonomous voltage override capability allows the instrument to provide independent capacitor control using line voltage input. When Voltage Override functionality is either Enabled or Disabled A field engineer can manually operate the bank. The line voltage measurement has no influence on manual operation.

FIG. 15 depicts an illustrative example of a capacitor control interactive dynamic interface touch screen display Set Up Screen 3—Temperature Control 102g. The interactive dynamic interface touch screen display Temperature Control Screen 102g provides user configurable access to the capacitor control temperature control parameters. From this screen the user can view and adjust the temperature control behavior of the capacitor control. For user convenience there are a series of pre-programmed common "personalities" into the system 100. By choosing the users desired "personality" the ease of configuration is simplified, and speed of configuration is drastically reduced. The autonomous temperature override capability allows the instrument to provide independent capacitor control using an internal ambient temperature input. When temperature override functionality is either Enabled or Disabled. A field engineer can manually operate the capacitor bank. The temperature measurement has no influence on manual operation. The system 100 customer default "personality" is reviewed and/or changed from the system 100 Set Up Screen. By entering a numerical value based upon the programmed list of default personalities stored in the system 100 memory, the settings for each personality type can be reviewed and/or confirmed for programmed storage into the system 100 memory. In this manner each time the system 100 is power cycled the customer specific memory is retained and activated without having to program each particular condition setting. Stored personalities allow the ability to change between sets of condition settings that may be implemented by e.g. event, time of day, etc.

FIG. 16 depicts an illustrative example of a capacitor control interactive dynamic interface touch screen display Set Up Screen—Time of Day Control 102h of the system 100. The capacitor control Time of Day Override Screen 102h provides user configurable access to the capacitor control Time of Day Control parameters. From this screen the user can view and adjust the time of the day and day of the week control behavior of the capacitor control. For user convenience there are a series of pre-programmed common "personalities" into the instrument. By choosing the users desired "personality" the ease of configuration is simplified and speed of configuration is drastically reduced. The autonomous time override capability allows the instrument to provide independent capacitor control using an internal real time clock. When Time of Day Override functionality is either Enabled or Disabled A field engineer can manually operate the bank. The time of day has no influence on manual operation.

FIG. 17 depicts an illustrative example of a capacitor control interactive dynamic interface touch screen display Var Override Screen 102i of the system 100. The interactive dynamic interface touch screen display Override Screen 102i provides user configurable access to the capacitor control Var Control parameters. From this screen the user can view and adjust the Var control behavior of the capacitor control. For user convenience there are a series of pre-programmed common "personalities" into the capacitor control. By choosing the users desired "personality" the ease of configuration is simplified, and speed of configuration is drastically reduced. The Var override capability allows the instrument to provide independent capacitor control using external primary current and voltage sensors. When Var Override functionality is either Enabled or Disabled A field engineer can manually operate the bank. The Var setting has no influence on manual operation.

Figure 18:
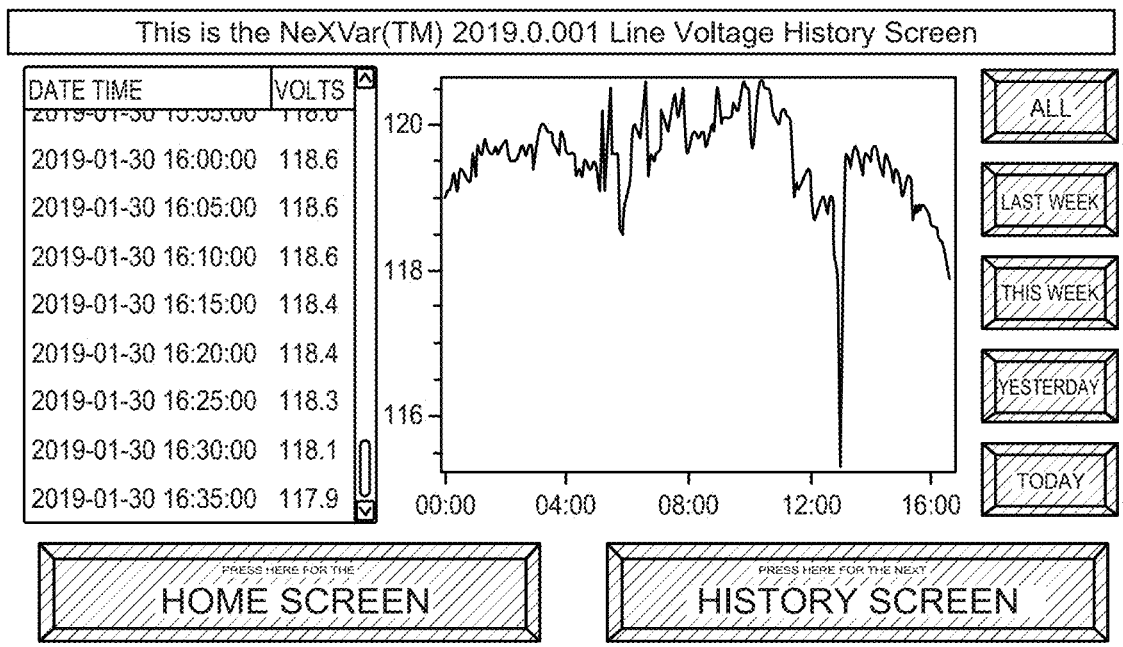
FIG. 18 is an illustrative example of an interactive dynamic interface display Line Voltage History Screen.

FIGS. 18 and 19 depict illustrative examples of a capacitor control interactive dynamic interface touch screen display History Screens 102*j* and 102*k* of the system 100 that can be accessed from the Home Screen touch screen display 102*a* of FIG. 9A and FIG. 9B. FIG. 18 depicts a Line Voltage History Screen 102*j*. FIG. 19 depicts a Operational History Screen 102*k*. The interactive dynamic interface touch screen display History Screens 102*j* and 102*k* provides users the ability to quickly and easily view historical events stored in the memory of the system 100. The history screens provide both tabulated data in columnar and graphed formats. Historical event data is stored in non-volatile memory and can be downloaded to a storage device using the USB or serial ports. In certain embodiments, The systems 100 internal memory can hold 100,000 data points. Data recording intervals are programmable. The standard data recording interval is 5 minutes.

FIGS. 20A-20F depict various illustrative examples of personality setting matrices of the system 100 that can be accessed using the keyboard 102*e* of FIG. 13. FIG. 20A depicts an example personality 0 based on Time/Volts. FIG. 20B depicts an example personality 1 based on VAR/Voltage. FIG. 20C depicts an example personality 2 based on Voltage. FIG. 20D depicts an example personality 3 based on Temperature. FIG. 20E depicts an example personality 4 based on Supervisory Control and Data Acquisition (SCADA). FIG. 20F depicts an example personality 32767 providing a Test mode.

Figure 21:
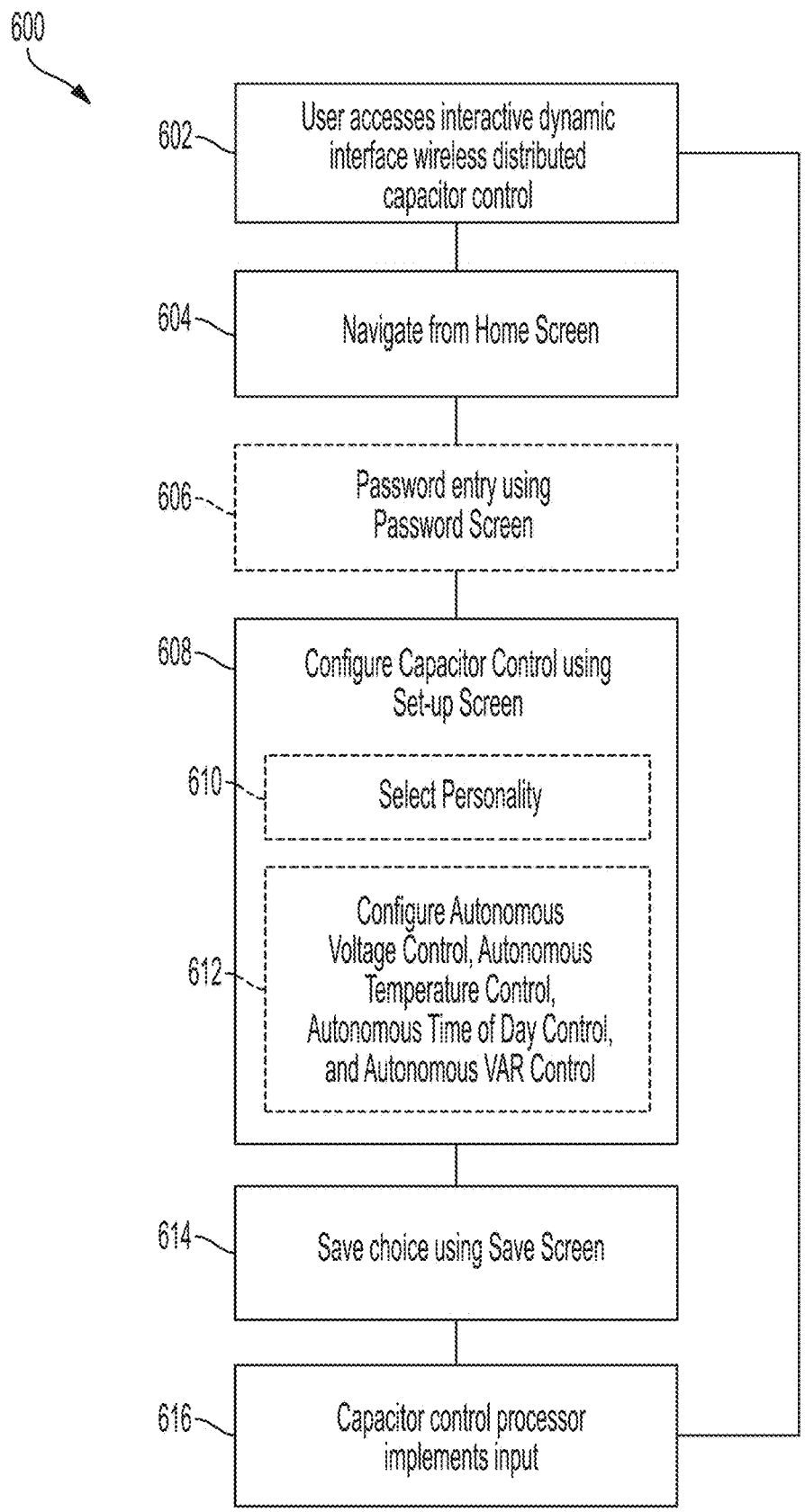
FIG. 21 is a flowchart depicting an illustrative example of a method.

FIG. 21 depicts a flowchart depicting an illustrative example of a method 600 for operating the system 100 according to specific sets of personality settings derived from the user. The capacitor controller is pre-programmed with default settings. Upon receipt of electrical signals/input, environmental input, or user input, the system 100 may operate the processor 106 to change the personality settings, which changes how the system 100 operates. Input from a user may include providing a new personality setting through the interactive dynamic interface at step 602, directly or via wireless communication through use of a remote computing device.

Alternatively, the system 100 may receive electrical signals/input or environmental input that meet particular criteria for automatically changing the personality settings to more efficiently or effectively operate the capacitor control. As an example, personality settings may be changed during specific periods of time or specific grid use conditions, or when the temperature sensor measures specific temperatures meeting criteria for personality setting adjustment.

At Step 604 the user is presented with the Home Screen touch screen display 102*a* of the interactive dynamic interface. From the Home Screen touch screen display 102*a* the user can manually TRIP, or CLOSE the capacitor bank, as well as view the status of the system 100. The user can also recall system 100 historical events and proceed with configuration of alternate parameters by navigating from the Home Screen to subsequent screens. If the password function is enabled, at step 606 the user will be prompted to enter a password for access to the full functionality and programmability of the capacitor control by using the interactive dynamic interface touch screen display Password Screen 102*c*. If the password function is enabled and the password is entered correctly, at step 608 configuration of the capacitor control can be performed. From this screen the user can view and adjust the behavior of some common capacitor control functions including a series of user entered or common pre-programmed "personalities" modifying the interactive dynamic interface wireless distributed capacitor control using personality selection screen 102*e* at step 610. Similarly, at step 612, the user can configure the autonomous voltage control using voltage control screen 102*f*, the autonomous temperature control using temperature control screen 102*g*, the autonomous time of day control using tie of day screen 102*h*, and the autonomous var control using var control screen 102*i*. With each successive screen choice, at step 614 the interactive dynamic interface touch screen display will provide a save screen 102*b* prompting the user to Save All Changes, Cancel All Changes, thereby allowing alterations to be committed to memory 108. Then at step 616, the processor 106 of the system 100 then implements the input newly selected control personality and operates the capacitor control accordingly.

Figure 22:
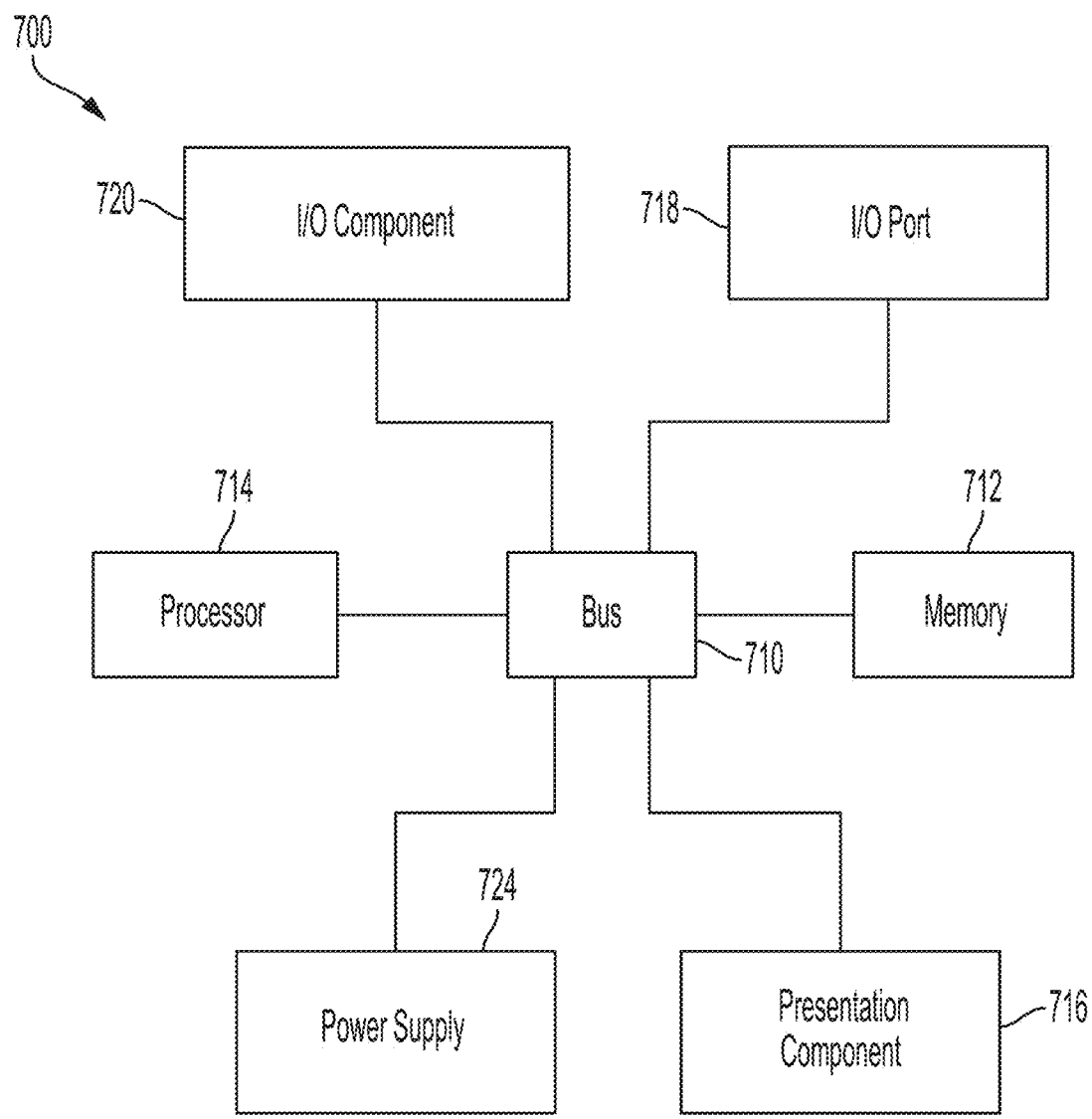
FIG. 22 is a diagrammatic illustration of a high-level architecture for implementing processes in accordance with aspects of the invention.

The system 100, method 600 and apparatus comprise at least one capacitor control unit built to specifications according to the configuration detailed herein. In order to communicate with the at least one capacitor control unit in a special networked implementation, the system 100, method 600 and apparatus may comprise one or more intelligent electronic devices 122 or remote computing devices. Any suitable computing device can be used to implement the interface 102 and the one or more intelligent electronic devices 122 and methods/functionality described herein and can be converted to a specific system 100 for performing the operations and features described herein through modification of hardware, software, and firmware, in a manner significantly more than mere execution of software on a generic computing device, as would be appreciated by those of skill in the art. One illustrative example of such an intelligent electronic device 700 is depicted in FIG. 22. The intelligent electronic device 700 is merely an illustrative example of a suitable computing environment and in no way limits the scope of the present invention. An "intelligent electronic device" or "remote computing device," as represented by FIG. 22, can include a "workstation," a "server," a "laptop," a "desktop," a "hand-held device," a "mobile device," a "tablet computer," or other computing devices, as would be understood by those of skill in the art. Given that the remote computing device 700 is depicted for illustrative purposes, embodiments of the present invention may utilize any number of intelligent electronic devices 700 in any number of different ways to implement a single embodiment of the present invention. Accordingly, embodiments of the present invention are not limited to a single intelligent electronic device 700, as would be appreciated by one with skill in the art, nor are they limited to a single type of implementation or configuration of the example intelligent electronic device 700.

The remote computing device 700 can include a bus 710 that can be coupled to one or more of the following illustrative components, directly or indirectly: a memory 712, one or more processors 714, one or more presentation components 716, input/output ports 718, input/output components 720, and a power supply 724. One of skill in the art will appreciate that the bus 710 can include one or more busses, such as an address bus, a data bus, or any combination thereof. One of skill in the art additionally will appreciate that, depending on the intended applications and uses of a particular embodiment, multiple of these components can be implemented by a single device. Similarly, in some instances, a single component can be implemented by multiple devices. As such, FIG. 22 is merely illustrative of an exemplary computing device that can be used to implement one or more embodiments of the present invention, and in no way limits the invention.

The computing device 700 can include or interact with a variety of computer-readable media. For example, computer-readable media can include Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices that can be used to encode information and can be accessed by the computing device 700.

The memory 712 can include computer-storage media in the form of volatile and/or nonvolatile memory. The memory 712 may be removable, non-removable, or any combination thereof. Exemplary hardware devices are devices such as hard drives, solid-state memory, optical-disc drives, and the like. The computing device 700 can include one or more processors that read data from components such as the memory 712, the various I/O components 716, etc. Presentation component(s) 716 present data indications to a user or other device. Exemplary presentation components include a display device, speaker, printing component, vibrating component, etc.

The I/O ports 718 can enable the computing device 700 to be logically coupled to other devices, such as I/O components 720. Some of the I/O components 720 can be built into the computing device 700. Examples of such I/O components 720 include a microphone, joystick, recording device, game pad, satellite dish, scanner, printer, wireless device, networking device, and the like.

To any extent utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about" and "approximately" are intended to cover variations that may existing in the upper and lower limits of the ranges of subjective or objective values, such as variations in properties, parameters, sizes, and dimensions. In one non-limiting example, the terms "about" and "approximately" mean at, or plus 10 percent or less, or minus 10 percent or less. In one non-limiting example, the terms "about" and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. An interactive dynamic interface capacitor control system for wireless distributed capacitor control, the system comprising:
    a protective enclosure;
    an interactive touch screen display that provides for adjustment and alteration of the system using operations comprising autonomous voltage control, autonomous temperature control, autonomous time of day control, and autonomous var control, wherein the touch screen display is in electronic communication with a printed circuit board having a processor and memory configured to provide capacitor control;
    a power supply powered by an internal transformer adapted for electrical communication of an external supply-line voltage to the printed circuit board, wherein the printed circuit board is configured to be in electronic communication with:
        a core of configurable analog inputs and digital status inputs;
        a stab socket mount;
        multiple LED status indicators; and
        connectors for communications, compression terminal blocks for field terminations;
    wherein the interactive dynamic interface capacitor control system provides control personality settings for capacitor control that simplifies custom configurations and profiles dynamically upon occurrence of operating criteria or user input through the interactive dynamic interface capacitor control system that is performed by at least one of local, remote or autonomous operation input.

2. The interactive dynamic interface capacitor control system of claim 1, wherein the protective enclosure comprises a polycarbonate enclosure.

3. The interactive dynamic interface capacitor control system of claim 1, wherein the interactive dynamic interface capacitor control system further comprises wireless connectivity.

4. The interactive dynamic interface capacitor control system of claim 1, wherein the interactive touch screen is provided on an Intelligent Electronic Device for controlling the capacitor remotely.

5. The interactive dynamic interface capacitor control system of claim 1, wherein the stab socket mount is a four-stab socket.

6. The interactive dynamic interface capacitor control system of claim 1, wherein the stab socket mount is a six-stab socket.

7. The interactive dynamic interface capacitor control system of claim 1, wherein a home screen of the interactive dynamic interface wireless distributed capacitor control system recalls and displays system historical events and enables a user to proceed with configuration of alternate parameters.

8. The interactive dynamic interface capacitor control system of claim 1, wherein a set-up screen of the interactive dynamic interface wireless distributed capacitor control enables a user to configure capacitor control comprising autonomous voltage control, autonomous temperature control, autonomous time of day control, and autonomous var control.

9. The interactive dynamic interface capacitor control system of claim 1, wherein a set-up screen of the interactive dynamic interface wireless distributed capacitor control enables a user to configure capacitor control including selection of a control personality setting.

10. An interactive dynamic interface capacitor control system, comprising:
   a protective enclosure;
   a touch screen display in electronic communication with
      a printed circuit board having a processor and memory configured to provide wireless distributed capacitor control;
   wherein the printed circuit board is in electronic communication with
      a stab socket mount;
      multiple LED status indicators;
      connectors for communications, communication ports, and compression terminal blocks for field terminations;
      analog inputs, digital inputs, status inputs; and
      a power supply connected to a network of external power distribution components;
   wherein the capacitor control includes control personality settings for capacitor control that simplifies custom configurations and profiles dynamically upon occurrence of operating criteria or user input through the interactive dynamic interface capacitor control system that may be performed by at least one of local, remote or autonomous operation input.

11. The interactive dynamic interface capacitor control system of claim 10, wherein the protective enclosure comprises a polycarbonate enclosure.

12. The interactive dynamic interface capacitor control system of claim 10, wherein the interactive dynamic interface capacitor control is configured to operate in a smart grid of powerlines comprising at least one supply-line voltage.

13. The interactive dynamic interface capacitor control system of claim 10, wherein the interactive dynamic interface capacitor control further comprises wireless connectivity.

14. The interactive dynamic interface capacitor control system of claim 10, wherein the touch screen is provided on a separate mobile electronic device for controlling the capacitor remotely.

15. The interactive dynamic interface capacitor control system of claim 10, wherein the capacitor control comprises autonomous voltage control, autonomous temperature control, autonomous time of day control, and autonomous var control.

16. A method of operating an interactive dynamic interface system for capacitor control, the method comprising:
   providing an interactive dynamic interface system for capacitor control, the system comprising:
      a protective enclosure;
      an interactive touch screen display that provides for adjustment and alteration of the system using operations comprising autonomous voltage control, autonomous temperature control, autonomous time of day control, and autonomous var control, wherein the touch screen display is in electronic communication with a printed circuit board having a processor and memory configured to provide distributed capacitor control;
      a power supply powered by an internal transformer adapted for electrical communication of an external supply-line voltage to the printed circuit board, wherein the printed circuit board is configured to be in electronic communication with:
         a core of configurable analog inputs and digital status inputs;
         a stab socket mount;
         multiple light emitting diode (LED) status indicators; and
         connectors for communications, compression terminal blocks for field terminations;
      wherein the interactive dynamic interface system provides control personality settings for capacitor control that simplifies custom configurations and profiles dynamically upon occurrence of operating criteria or user input through the interactive dynamic interface system that may be performed by at least one of local, remote or autonomous operation input;
   accessing the interactive dynamic interface system;
   navigating a home screen provided on the touch screen display;
   configuring capacitor control using a set-up screen provided on touch screen;
   saving configuration using a save screen provided on touch screen; and
   implementing the saved capacitor control configuration.

17. The method of claim 16, further comprising entering a password to access the system using a password screen provided on the touch screen.

18. The method of claim 16, wherein configuring capacitor control comprises selecting a control personality for capacitor control.

19. The method of claim 16, wherein configuring capacitor control comprises configuring at least one of autonomous voltage control, autonomous temperature control, autonomous time of day control, and autonomous var control.

* * * * *